United States Patent
Shono et al.

(10) Patent No.: US 10,727,704 B2
(45) Date of Patent: Jul. 28, 2020

(54) MAGNETIC POLE, MAGNETIC POLE MANUFACTURING METHOD, AND STATOR

(71) Applicant: MITSUBISHI ELECTRIC CORPORATION, Chiyoda-ku, Tokyo (JP)

(72) Inventors: Kazuhiro Shono, Tokyo (JP); Ryohei Uno, Tokyo (JP); Yusuke Nakagawa, Tokyo (JP); Yuki Tamura, Tokyo (JP); Koji Masumoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 109 days.

(21) Appl. No.: 16/080,374

(22) PCT Filed: Feb. 23, 2017

(86) PCT No.: PCT/JP2017/006912
§ 371 (c)(1),
(2) Date: Aug. 28, 2018

(87) PCT Pub. No.: WO2017/175508
PCT Pub. Date: Oct. 12, 2017

(65) Prior Publication Data
US 2019/0074735 A1 Mar. 7, 2019

(30) Foreign Application Priority Data

Apr. 7, 2016 (JP) ................................. 2016-077108

(51) Int. Cl.
*H02K 3/34* (2006.01)
*H02K 1/16* (2006.01)
(Continued)

(52) U.S. Cl.
CPC .............. *H02K 1/165* (2013.01); *H02K 1/146* (2013.01); *H02K 1/18* (2013.01); *H02K 3/325* (2013.01);
(Continued)

(58) Field of Classification Search
CPC .......... H02K 3/522; H02K 3/34; H02K 1/148; H02K 2203/12
See application file for complete search history.

(56) References Cited

U.S. PATENT DOCUMENTS 6,984,911 B2 * 1/2006 Horie ..................... H02K 3/325
 310/194
7,649,295 B2 * 1/2010 Fukui ..................... H02K 3/522
 310/215

(Continued)

FOREIGN PATENT DOCUMENTS

CN 102301567 A 12/2011
JP 2001112205 A 4/2001
(Continued)

OTHER PUBLICATIONS

Extended European Search Report dated Sep. 30, 2019 for corresponding European patent application No. 17778887.4, 13 pages.
(Continued)

*Primary Examiner* — Dang D Le
(74) *Attorney, Agent, or Firm* — Buchanan Ingersoll & Rooney PC

(57) ABSTRACT

A magnetic pole includes a core, winding frames, and sheet-like insulators. The winding frames are provided to both ends, in a direction along the central axis, of the core, and have thin portions and projections. The thin portions and the projections extend in a direction along the central axis. The insulators are provided on both sides in the circumferential direction of a tooth portion. A part of each insulator is
(Continued)

held by being sandwiched between the projection and the thin portion provided to each winding frame.

20 Claims, 28 Drawing Sheets

(51) Int. Cl.
    *H02K 1/18*       (2006.01)
    *H02K 15/10*     (2006.01)
    *H02K 3/32*       (2006.01)
    *H02K 1/14*       (2006.01)
    *H02K 15/02*     (2006.01)

(52) U.S. Cl.
    CPC ............... *H02K 3/34* (2013.01); *H02K 3/345* (2013.01); *H02K 15/024* (2013.01); *H02K 15/10* (2013.01); *H02K 1/148* (2013.01); *H02K 2203/12* (2013.01); *H02K 2213/03* (2013.01)

(56) References Cited

U.S. PATENT DOCUMENTS 10,103,594 B2 * 10/2018 Takimoto ............... H02K 1/148
2006/0033395 A1 * 2/2006 Izumi ....................... H02K 3/18
                                                                310/208
2011/0273053 A1 * 11/2011 Oka ....................... H02K 3/345
                                                                 310/215

FOREIGN PATENT DOCUMENTS

| JP | 2003111329 A | 4/2003 |
| JP | 2011-188675 A | 9/2011 |
| JP | 2011259614 A | 12/2011 |
| JP | 2016036223 A | 3/2016 |

OTHER PUBLICATIONS

Office Action dated Oct. 22, 2019, by the Chinese Patent Office in corresponding Chinese Patent Application No. 201780019812.2 and English translation of the Office Action. (21 pages).

International Search Report (PCT/ISA/210) dated May 16, 2017, by the Japanese Patent Office as the International Searching Authority for International Application No. PCT/JP2017/006912.

Written Opinion (PCT/ISA/237) dated May 16, 2017, by the Japanese Patent Office as the International Searching Authority for International Application No. PCT/JP2017/006912.

* cited by examiner

MAGNETIC POLE, MAGNETIC POLE MANUFACTURING METHOD, AND STATOR

TECHNICAL FIELD

The present invention relates to a magnetic pole for a rotary electric machine, a method for manufacturing a magnetic pole, and a stator, and in particular, relates to a magnetic pole having increased efficiency and increased insulation property at low cost.

BACKGROUND ART

In a conventional stator core for a rotary electric machine, a configuration is disclosed in which a pair of step portions extending inward from both end sides in the thickness direction and having predetermined length and level difference are formed at a part of any of surfaces on the inner side of a protruding portion of a magnetic pole tooth portion, the magnetic pole tooth portion, and the inner side of a yoke portion, an insulating winding frame is fitted to each step portion with the thickness-direction length thereof matched with the length of the step portion, and on both side areas between the pair of insulating winding frames, a pair of insulating films are provided of which both ends are applied to the surfaces of the pair of insulating winding frames and which are stretched between the pair of insulating winding frames (see, for example, Patent Document 1).

CITATION LIST

Patent Document

Patent Document 1: Japanese Laid-Open Patent Publication No. 2003-111329

SUMMARY OF THE INVENTION

Problems to be Solved by the Invention

However, in the configuration disclosed in Patent Document 1, both ends of the insulating films are applied to a trunk portion and both flange portions of each insulating winding frame by ultrasonic welding, and therefore a device for welding and a welding step are needed and equipment investment and increase in manufacturing cost are inevitable. In the case where management of a welding condition is insufficient and the welding condition is too strong, a hole is made in the insulating film, and conversely, if the welding condition is weak, the insulating film is not welded or other troubles occur. Thus, a problem can occur with the insulation reliability of the magnetic pole.

The present invention has been made to solve the above problems, and an object of the present invention is to provide a magnetic pole, a method for manufacturing a magnetic pole, and a stator that have a simple and highly-reliable insulation configuration and have stable insulation property.

Solution to the Problems

The present invention is a magnetic pole to form at least a part of a stator of a rotary electric machine by a plurality of the magnetic poles being arranged in an annular shape, the magnetic pole including: a core having an arc-shaped yoke portion forming a part of an outer circumferential portion of the stator, a tooth portion projecting from the yoke portion toward a central axis of the stator, and an end portion extending in a circumferential direction of the stator from an end on a central axis side of the tooth portion; winding frames provided to both ends, in a direction along the central axis, of the core, the winding frames having thin portions extending in the direction along the central axis, and projections projecting in the direction; and sheet-like insulators provided on both sides in the circumferential direction of the tooth portion, wherein a part of each insulator is held by being sandwiched between the projection and the thin portion provided to each winding frame.

Another aspect of the present invention is a stator including the magnetic poles and forming a part of the rotary electric machine.

Still another aspect of the present invention is a method for manufacturing the magnetic pole, the method including: a fitting step of fitting the winding frames to both ends in the central axis direction of the core; an arrangement step of arranging a part of an end in the central axis direction of each sheet-like insulator, into a gap between each thin portion and each projection; and a winding step of winding a coil around the tooth portion with the winding frames and the sheet-like insulators provided therebetween.

Effect of the Invention

According to the present invention, owing to the configuration and method as described above, it becomes possible to provide, at low cost, a magnetic pole that enables simplification of attachment of insulators and winding frames to a core and prevents the insulators from being damaged by an attachment work, thereby having increased insulation property.

DESCRIPTION OF EMBODIMENTS

Embodiment 1

Figure 1:
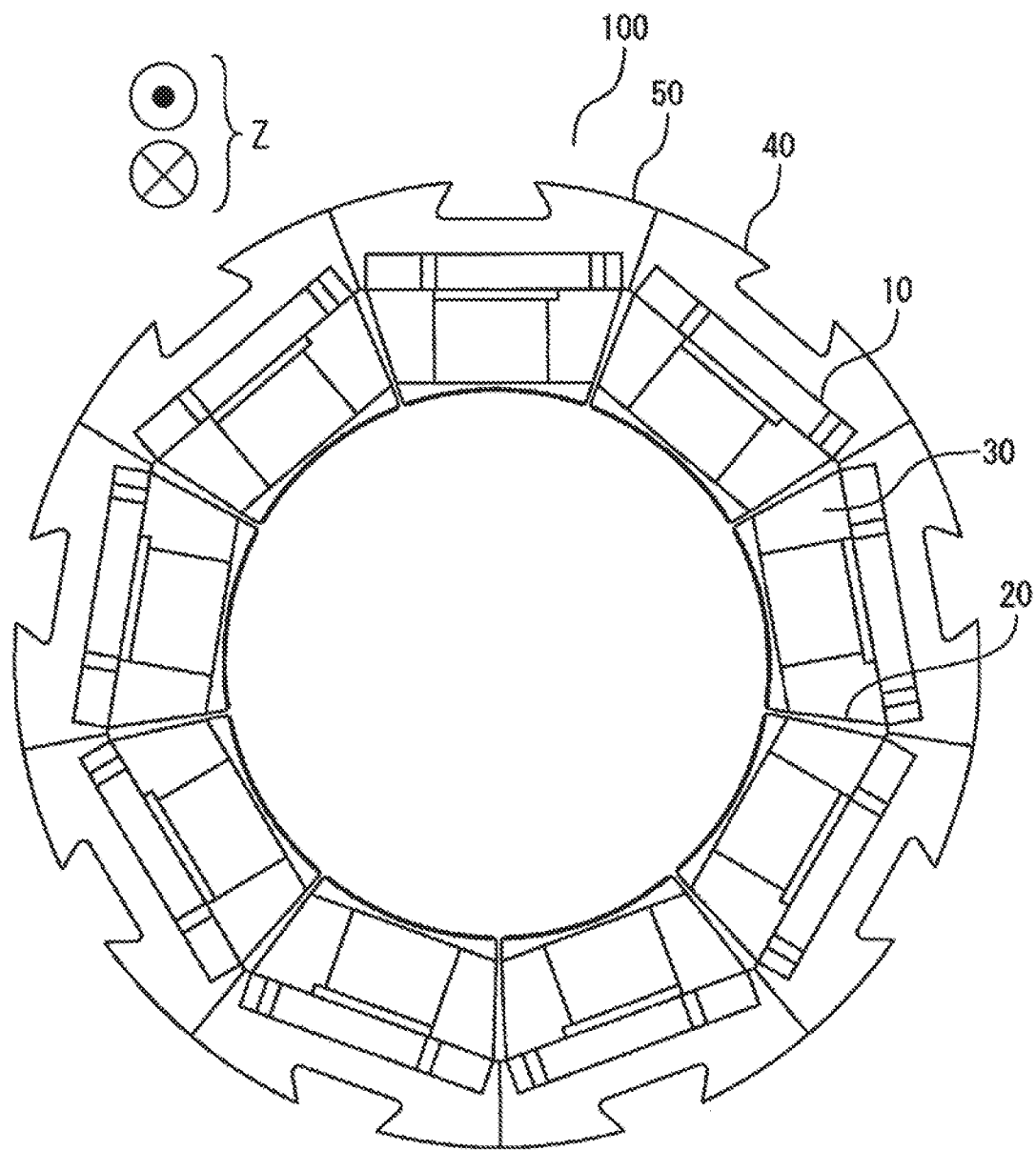
FIG. 1 is a sectional view of a stator of a rotary electric machine in embodiment 1.

Hereinafter, embodiment 1 of the present invention will be described with reference to the drawings. FIG. 1 is a sectional view of a stator 100 of a rotary electric machine. In FIG. 1, the stator 100 is assembled in an annular shape by connecting and arranging a plurality of magnetic poles 50 on a circle. Each magnetic pole 50 is composed of a core 40 and a coil 30 obtained by winding a conductor with a plurality of turns after attaching winding frames 10 and insulators 20 to the core 40.

The winding frames 10 have functions of electrically insulating the core 40 and the coil 30 from each other, allowing the coil 30 to be wound at a predetermined position, and supporting a connection portion between the coil and a terminal and holding the insulators at predetermined positions. As described in detail in FIG. 2, the core 40 is composed of: an arc-shaped yoke portion 42 forming a part of the outer circumferential portion of the stator 100 of the rotary electric machine and joined to the adjacent cores 40; a tooth portion 41 connected to the yoke portion 42 and projecting from the yoke portion 42 toward the central axis (rotation axis) of an armature of the rotary electric machine (not shown); and an arc-shaped end portion 43 opposed to the armature of the rotary electric machine (not shown). A direction toward the rotation axis of the rotary electric machine is referred to as "radially inward direction", and a direction opposite to the radially inward direction, i.e., a direction away from the rotation axis is referred to as "radially outward direction". Each core 40 is formed by stacking thin sheets that are stamped out. Here, the case where the stator of the rotary electric machine is formed by arranging a plurality of magnetic poles in an annular shape and the yoke portions have an arc shape is described. However, the yoke portions are not limited to an arc shape. In the case where magnetic poles are arranged in a polygonal annular shape, each yoke portion may have substantially a straight shape. The end portions also have an arc shape so as to keep an equal distance from the cylindrical armature of the rotary electric machine. However, as long as necessary performance is obtained even if the distance from the armature of the rotary electric machine is not kept equal, the part facing the armature of the rotary electric machine may have substantially a straight shape.

In the description, a direction parallel to the central axis of the rotary electric machine is referred to as an axial direction Z. Since the core 40 is formed by being stacked in the axial direction Z, the axial direction Z may be referred to as "stacking direction Z" of the core 40. The circumferential direction of the annular shape formed by the plurality of magnetic poles arranged around the axis is simply referred to as "circumferential direction".

Figure 2:
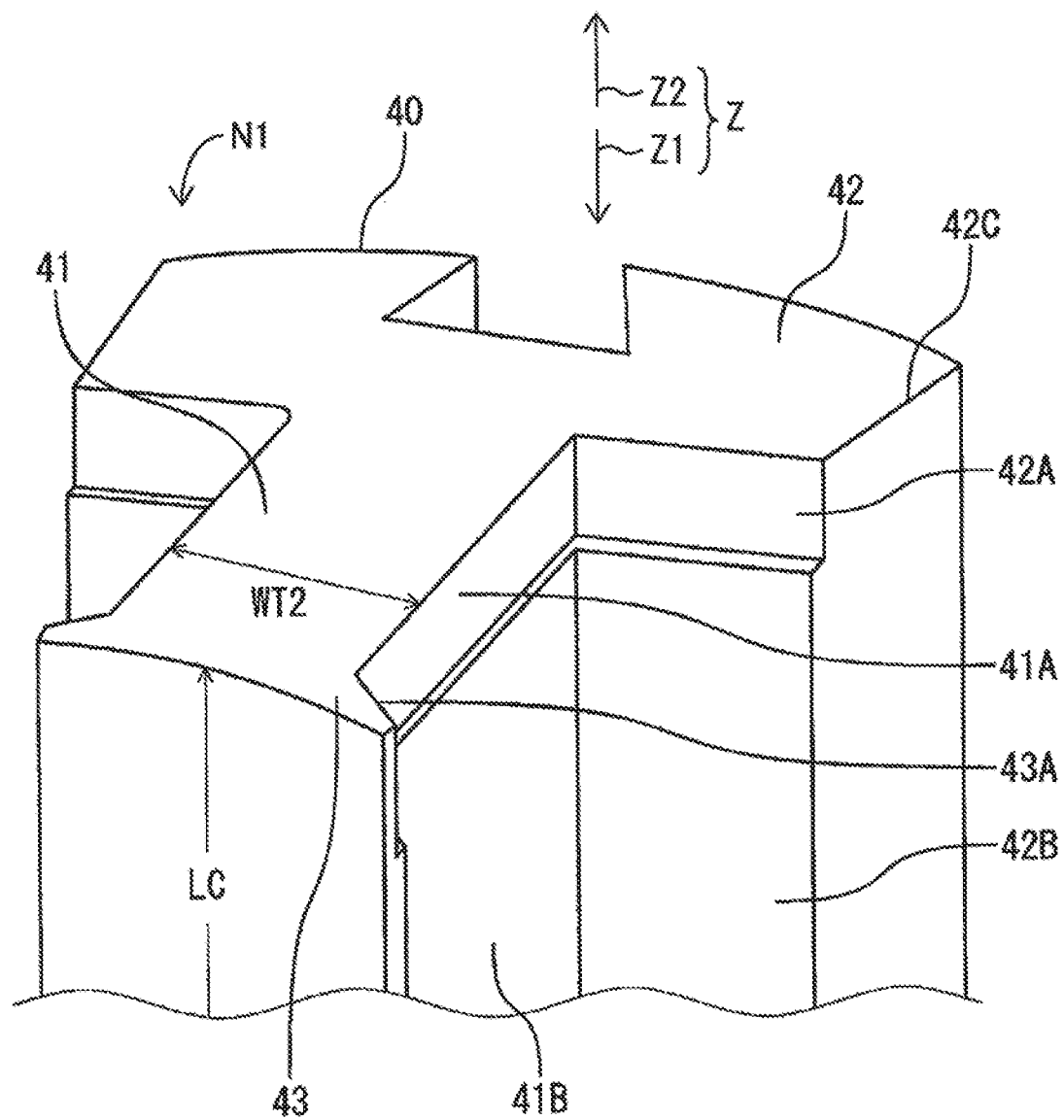
FIG. 2 is a perspective view of a core in embodiment 1.
Figure 3:
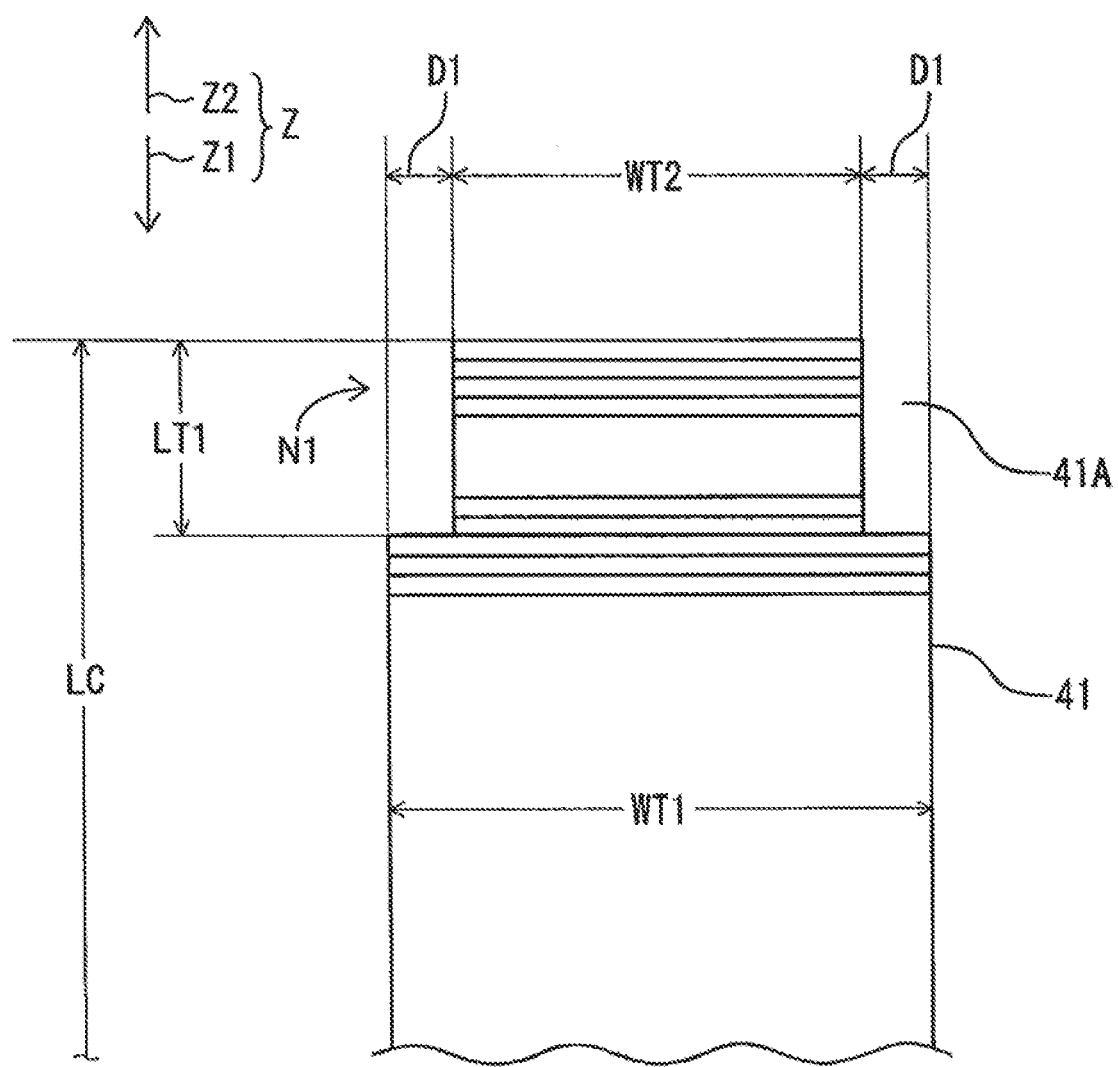
FIG. 3 is a sectional view of the core in embodiment 1.

FIG. 2 is a perspective view of a part of the core 40. As shown in FIG. 2, the core 40 has substantially a T shape and has a core length LC in the axial direction Z. At both ends N1, N2 in the axial direction Z of the core 40, a tooth step portion 41A, a yoke step portion 42A, and an end step portion 43A are formed. These step portions have the same shape, and FIG. 3 shows a sectional view of the tooth portion 41 including the tooth step portion 41A as a representative. A tooth portion width WT2 at a part where the tooth step portion 41A is formed has a value obtained by subtracting step depths D1 on both sides from a tooth portion width WT1, and the step portion has a step length LT1 in the axial direction Z.

Thin portions 11A, 12A, 13A of the winding frame 10 described later are to be fitted to the tooth step portion 41A, the yoke step portion 42A, and the end step portion 43A of the core 40. Since the step portions are provided at both ends N1, N2 in the axial direction Z of the core 40 as described above, the thin portions 11A, 12A, 13A do not protrude to the winding space side from the step portions. Therefore, the winding space for the coil 30 is expanded, and thus it becomes possible to, for example, enlarge the wire diameter of the coil conductor and increase the number of winding turns. Further, when the stator is formed, the efficiency is increased.

Figure 4:
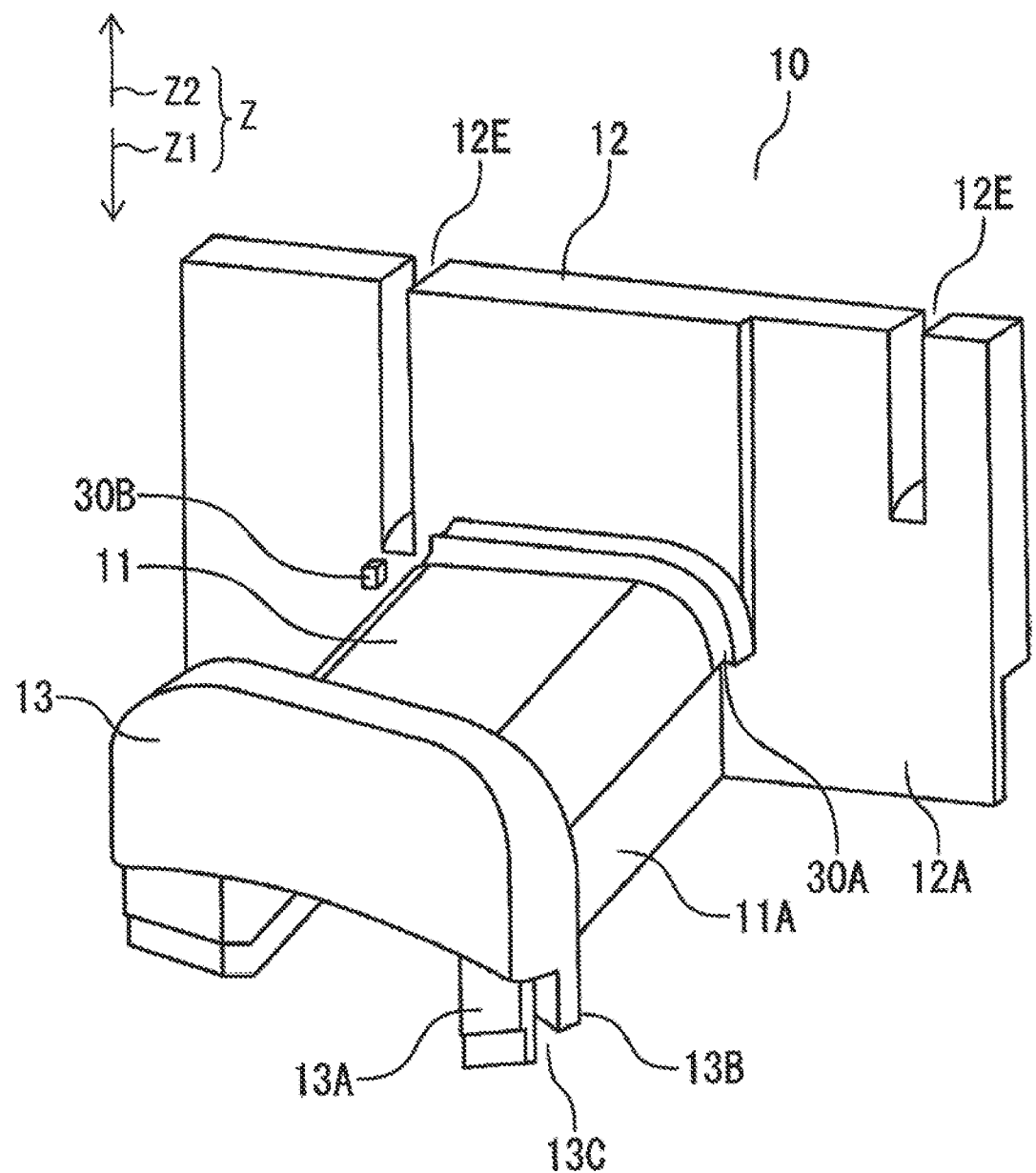
FIG. 4 is a perspective view of a winding frame in embodiment 1.

FIG. 4 is a perspective view of the winding frame 10. Although the winding frames 10 are provided at both ends N1, N2 in the axial direction Z of the core 40, FIG. 4 shows the winding frame 10 at one end N1. The winding frame 10 is molded with a resin material such as polybutylene terephthalate (PBT) or polyphenylene sulfide (PPS), to which a filler such as a glass fiber is added. As shown in FIG. 4, the winding frame 10 is composed of a first flange 12 provided on the yoke portion 42 side of the core 40, a second flange 13 provided on the end portion 43 side, and a trunk portion 11 connecting both flanges. The trunk portion 11 has a shape shown by a sectional view in FIG. 5 so that the trunk portion 11 can be mounted striding over the tooth portion 41 of the core 40.

FIG. 4 shows only the winding frame 10 fitted on one end N1 side, of the two winding frames 10 fitted to both ends N1, N2 in the axial direction Z of the core 40. In the axial direction Z, a direction toward the center in the axial direction Z of the core from both ends N1, N2 in the axial direction Z of the core is referred to as "center-side direction Z1", and in the axial direction Z, a direction opposite to the center-side direction Z1 is referred to as "separating direction Z2". The center-side direction Z1 and the separating direction Z2 do not indicate absolute directions, but are defined with the center in the axial direction Z of the core 40 as a reference.

Figure 5:
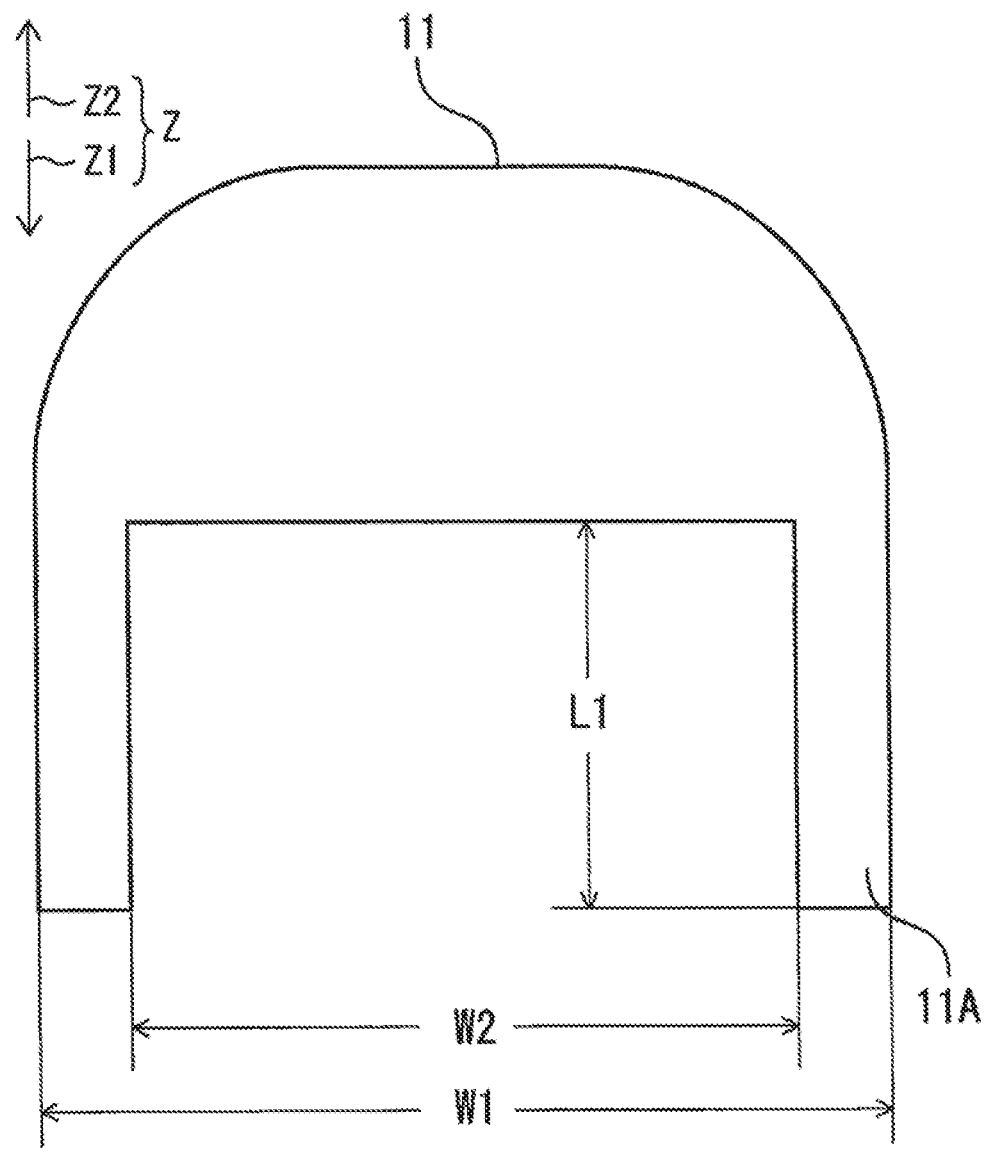
FIG. 5 is a sectional view of a trunk portion in embodiment 1.

In FIG. 5, a trunk portion width W1 is the same as the tooth portion width WT1 of the core 40 shown in FIG. 3, and a stride width W2 is set to a mountable dimension with respect to the tooth portion width WT2 at the part where the step portion is present. A length L1 of a striding leg 11E corresponds to the step length LT1 of the core 40 shown in FIG. 3.

The first flange 12 shown in FIG. 4 has grooves 12E through which the winding start wire and the winding end wire of the coil 30 are introduced. The second flange 13 has thin portions 13A extending in the axial direction Z so as to stride over the end portion 43 of the core 40, and projections 13B formed with gaps from the thin portions 13A. The projections 13B are formed in shapes elongated in the axial direction Z and extend in the center-side direction Z1. As the gap between the thin portion 13A and the projection 13B, a slit 13C having a predetermined depth dimension is formed, and a second surface 20B of the insulator 20 described later is inserted into the slit 13C.

Figure 6:
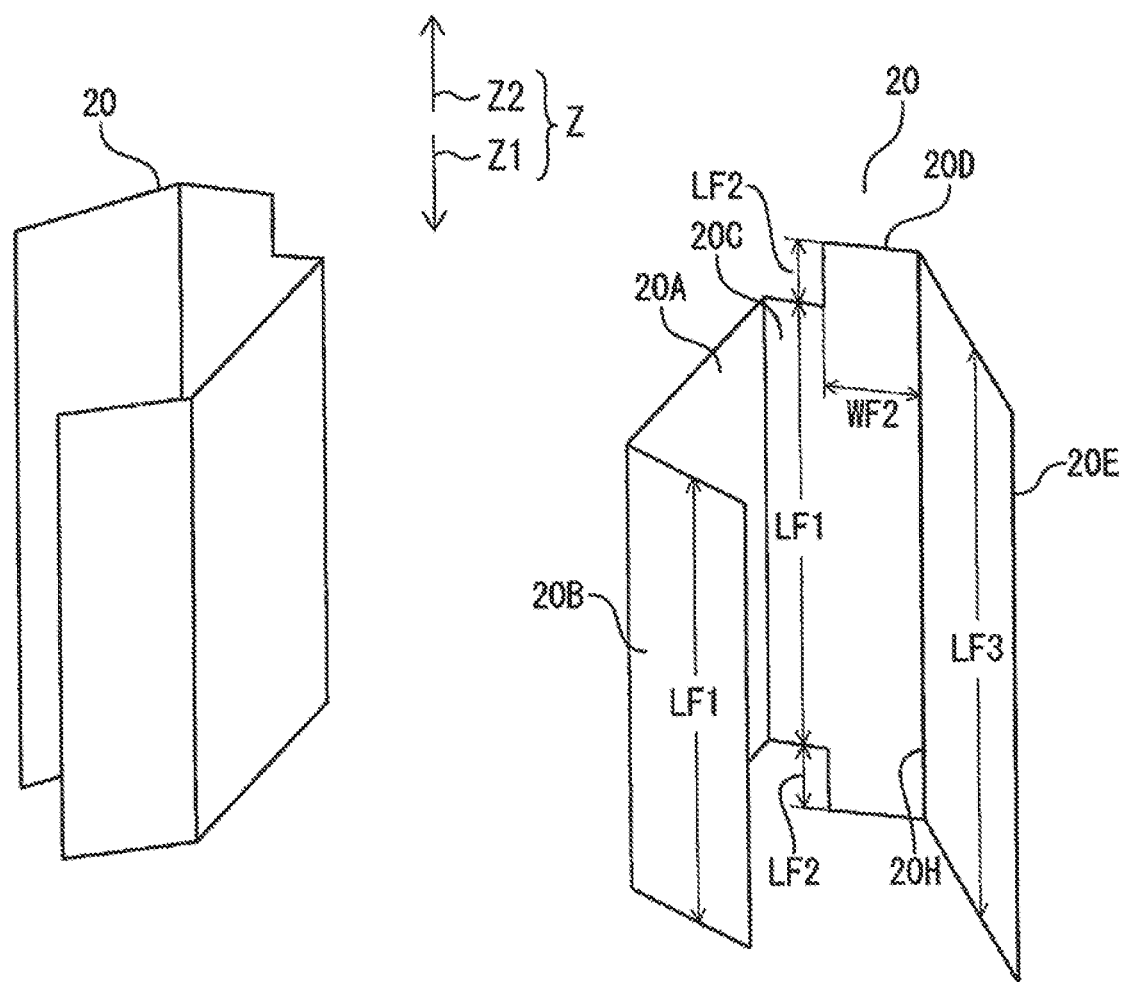
FIG. 6 is a perspective view of an insulator in embodiment 1.
Figure 7:
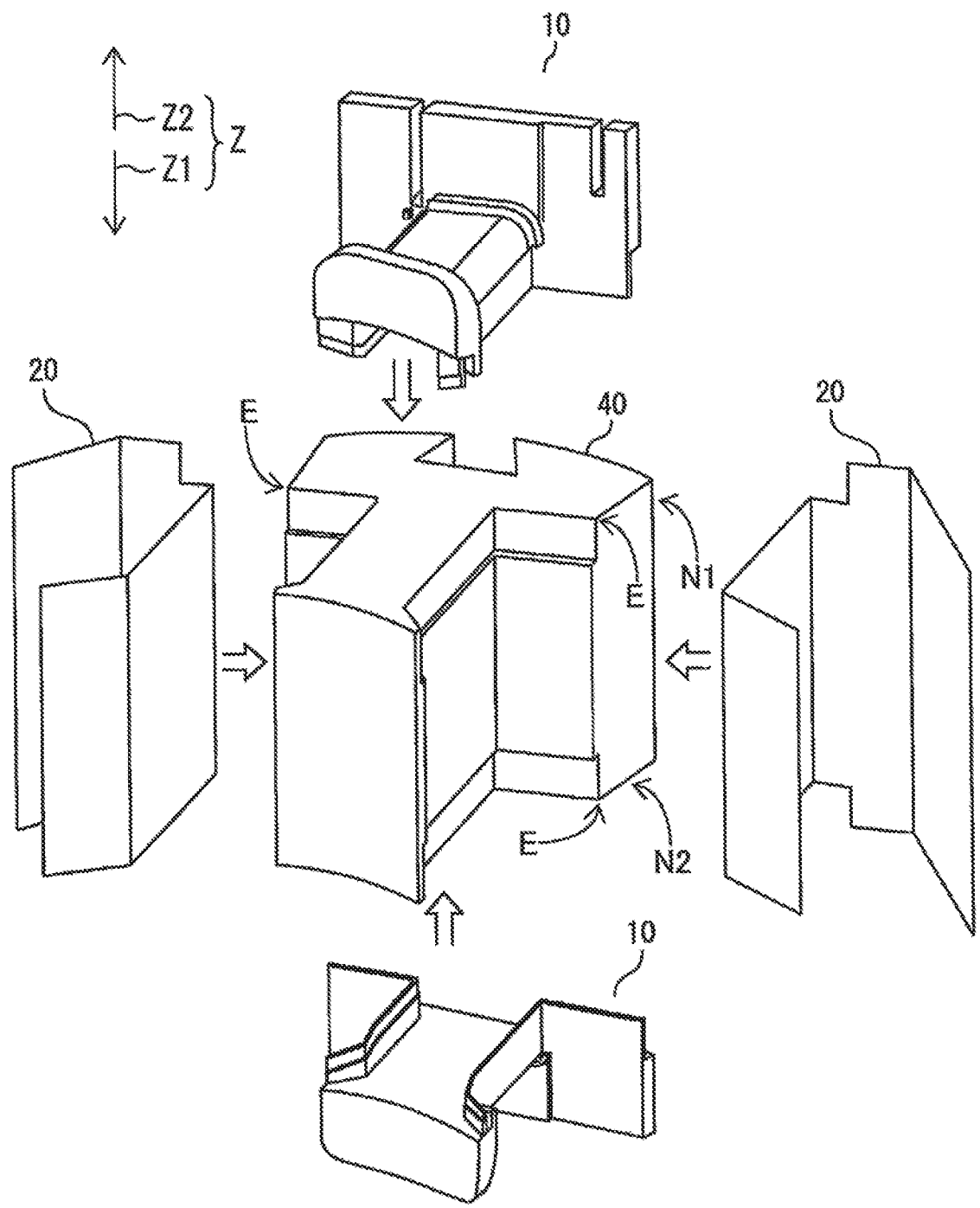
FIG. 7 is a perspective view showing attachment of the winding frames and the insulators to the core in embodiment 1.

FIG. 6 shows the insulators 20. FIG. 6 shows a state in which a pair of insulators 20 are provided to the core 40 which is not shown. FIG. 7 schematically shows a state before a pair of winding frames 10 and a pair of insulators 20 are attached to the core 40. For the insulators 20, a film material such as polyethylene terephthalate (PET) or polyethylene naphthalate (PEN) is used. As described later, the insulators 20 are mounted to the winding frames 10, tooth portion side surfaces 41B and yoke portion side surfaces 42B of the core 40, and the like, and thereafter, the coil 30 is wound. A first surface 20A has an axial-direction length LF1 which is almost equal to the core length LC, and is attached to the tooth portion side surface 41B of the core 40 and the thin portion 11A of the winding frame 10.

The second surface 20B has the same axial-direction length LF1 as the first surface 20A, and is attached to the end portion 43 of the core 40 and the slit 13C between the thin portion 13A and the projection 13B of the winding frame 10. A third surface 20C connected to the first surface 20A has, in an area other than an extension surface 20D, the same axial-direction length LF1 as the first surface 20A. The extension surface 20D connected to the third surface 20C has an axial-direction length LF3. An extension length LF2 is set to be equal to or greater than an insulation creeping distance determined by law and drive voltage of the rotary electric machine to which the magnetic pole 50 is applied. As used herein, the insulation creeping distance is a distance from, of the end part in the axial direction Z of the yoke portion 42, an end E that is inward in the radial direction and outward in the circumferential direction, to a winding mounted on the insulator 20. In the present embodiment, in the axial direction Z, the insulation creeping distance is ensured by the extension length LF2, and in the circumferential direction, the insulation creeping distance is ensured by a predetermined width WF2 of the extension surface 20D. For example, according to UL standard which is a product safety standard formulated by Underwriters Laboratories (abbreviation: UL) in North America, in UL984 (hermetic refrigerant motor compressor), a spatial distance of 3.2 mm and an insulation creeping distance of 4.8 mm are set as the minimum insulation distances at electric motor rating of 151 V to 300 V. By ensuring dimensions equal to or greater than the above values, it is possible to obtain the magnetic pole 50 ensuring insulation reliability. Other than this, setting may be made with reference to laws and regulations such as Electrical Appliances and Materials Safety Act in Japan or International Electrotechnical Commission in Europe. Similarly, the predetermined width WF2 is also set to a dimension equal to or greater than the extension length LF2. A fourth surface 20E connected to the extension surface 20D also has the axial-direction length LF3.

As shown in FIG. 6, a folded portion 20H at the boundary between the extension surface 20D and the fourth surface 20E is formed at a location corresponding to the position of a yoke end surface 42C shown in FIG. 2. The third surface 20C and the extension surface 20D are to be attached to the thin portion 12A of the first flange 12, and the second surface 20B and the fourth surface 20E serve to cover the surface of the coil 30. The surfaces of the insulator 20 after the magnetic pole 50 is formed have been folded at the respective connection portions.

The second surface 20B of the insulator 20 described above is inserted into the slit 13C of each winding frame 10, whereby the insulator 20 is held integrally with the core 40.

Figure 8:
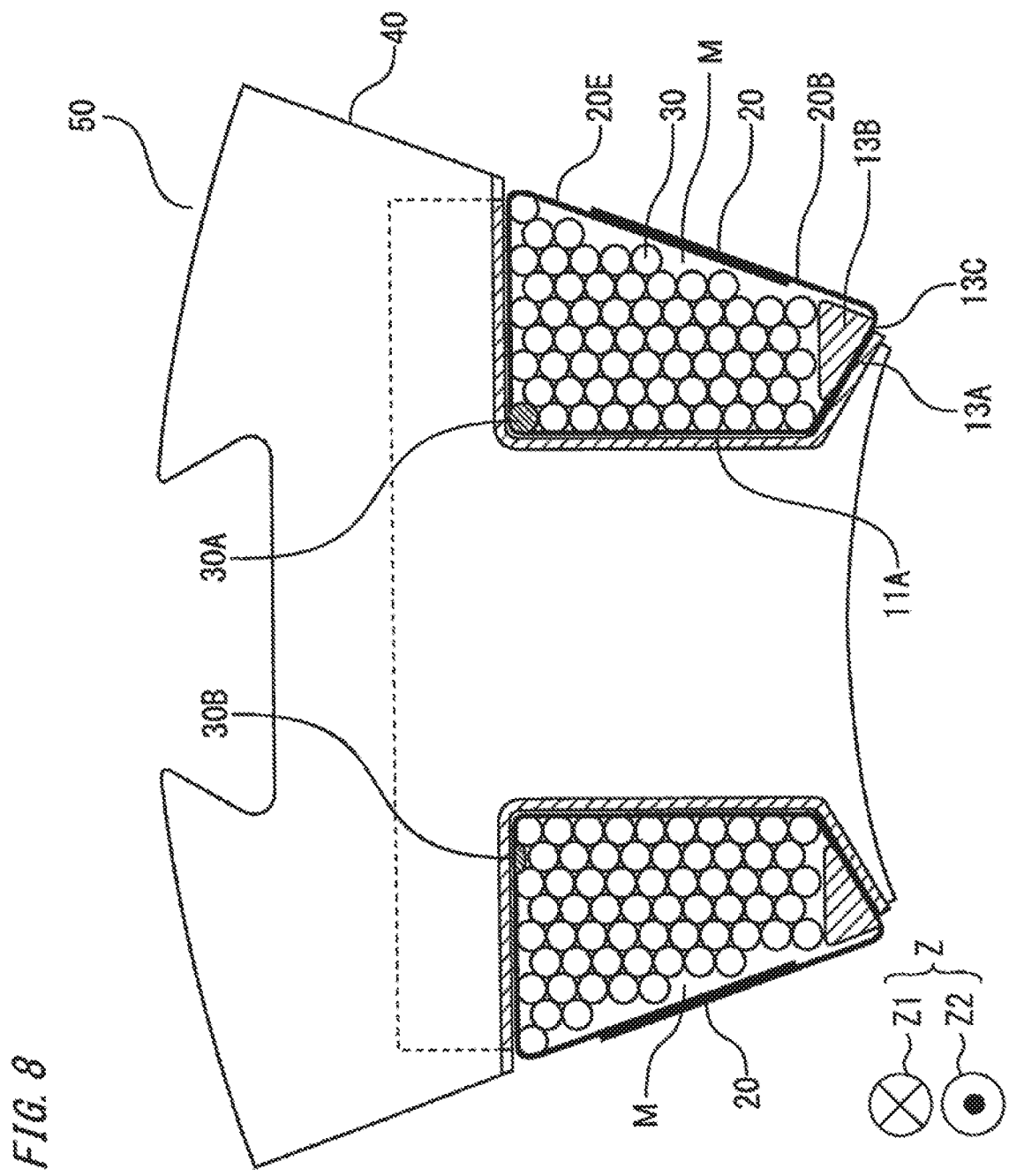
FIG. 8 is a sectional view of a magnetic pole in embodiment 1.

FIG. 8 is a sectional view of the magnetic pole 50 manufactured by winding the coil 30 after the winding frames 10 and the insulators 20 are attached to the core 40 described above. As shown in FIG. 8, the second surface 20B and the fourth surface 20E of each insulator 20 are folded so as to cover the coil 30, and thus increase insulation between the adjacent magnetic poles 50 when the stator 100 is formed. However, depending on the level of the standard voltage, the coil 30 may be covered by one of the second surface 20B and the fourth surface 20E.

In FIG. 8, when a conductor is wound around the core 40 to form the coil 30, dummy coils 30A, 30B serving to shape the coil 30 are provided on the first flange 12 side of the winding frame 10. Thus, regular winding of the coil 30 is facilitated. The dummy coils 30A, 30B are provided, on the winding frame, at positions near the radially outer end of the tooth portion 41 and in contact with the conductive wire located closest to the core 40 among the conductive wires forming the coil. In winding work for winding a conductive wire around the tooth portion 41 to form the coil, the dummy coils 30A, 30B position and guide the first one turn of the conductive wire. The dummy coils 30A, 30B may be referred to as "guiding projections 30A, 30B". As shown in FIG. 8, each sheet-like insulator 20 is arranged in a space M adjacent in the circumferential direction to the tooth portion 41. This space M may be referred to as "slot M".

Next, a process of attaching the winding frames 10 and the insulators 20 to the core 40 and then winding a conductor to form the coil 30 and obtain the magnetic pole 50 in embodiment 1, in which a coil winding process is not shown in the drawings, will be described with reference to FIG. 9 to FIG. 12. It is noted that, in FIG. 8 to FIG. 12 and in FIG. 22 described later, the upper side and the lower side of the core 40 are opposite to those in FIG. 13 to FIG. 20 described later, for convenience of description. However, the actual direction depends on the configuration of a winding machine. For example, in the case of a spindle winding machine which rotates a work, the output shaft of the spindle motor is often set upward in the vertical direction, and accordingly, the core 40 is arranged such that the tooth portion 41 is on the upper side and the yoke portion 42 is on the lower side. FIG. 9 to FIG. 12 show sectional views of the core 40 crossing the axial direction Z, and therefore, of the parts constituting the winding frame 10, only parts needed for description are shown, and the insulators 20 in these drawings are shown in a state before the folded portions 20H shown in FIG. 6 are formed.

Figure 9:
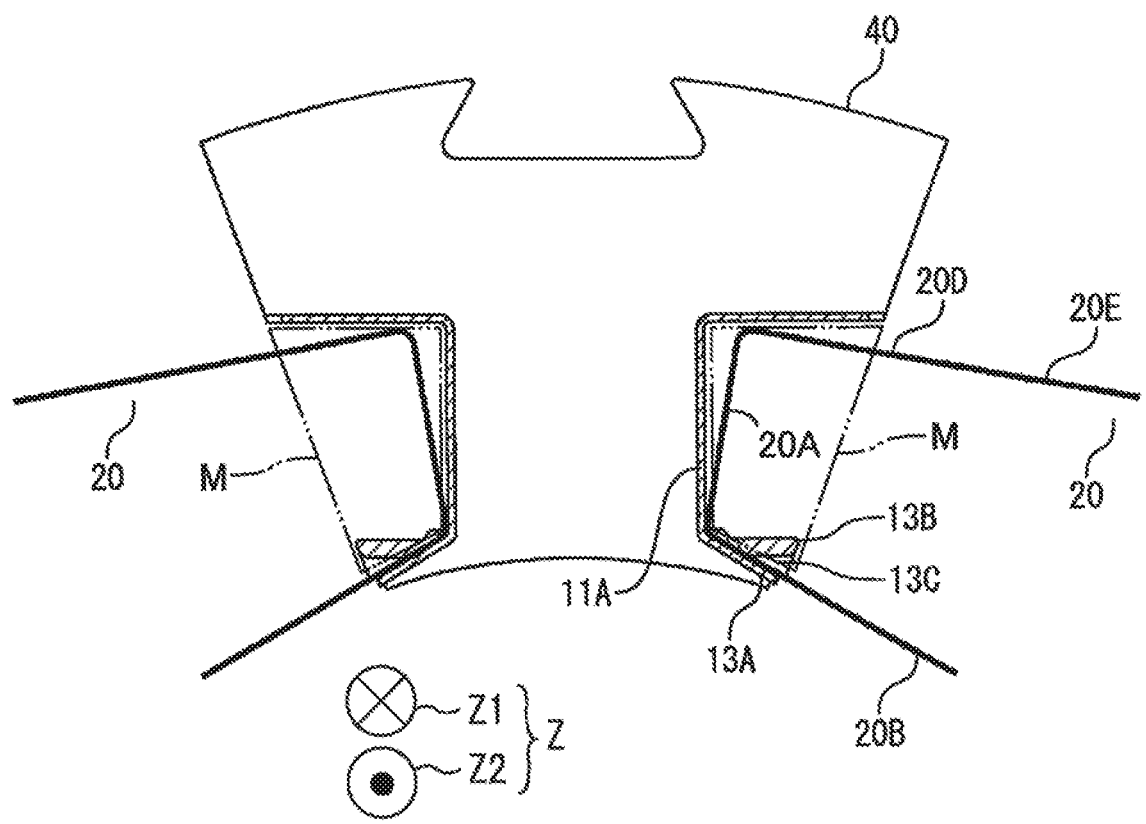
FIG. 9 illustrates a manufacturing process for the magnetic pole in embodiment 1.
Figure 10:
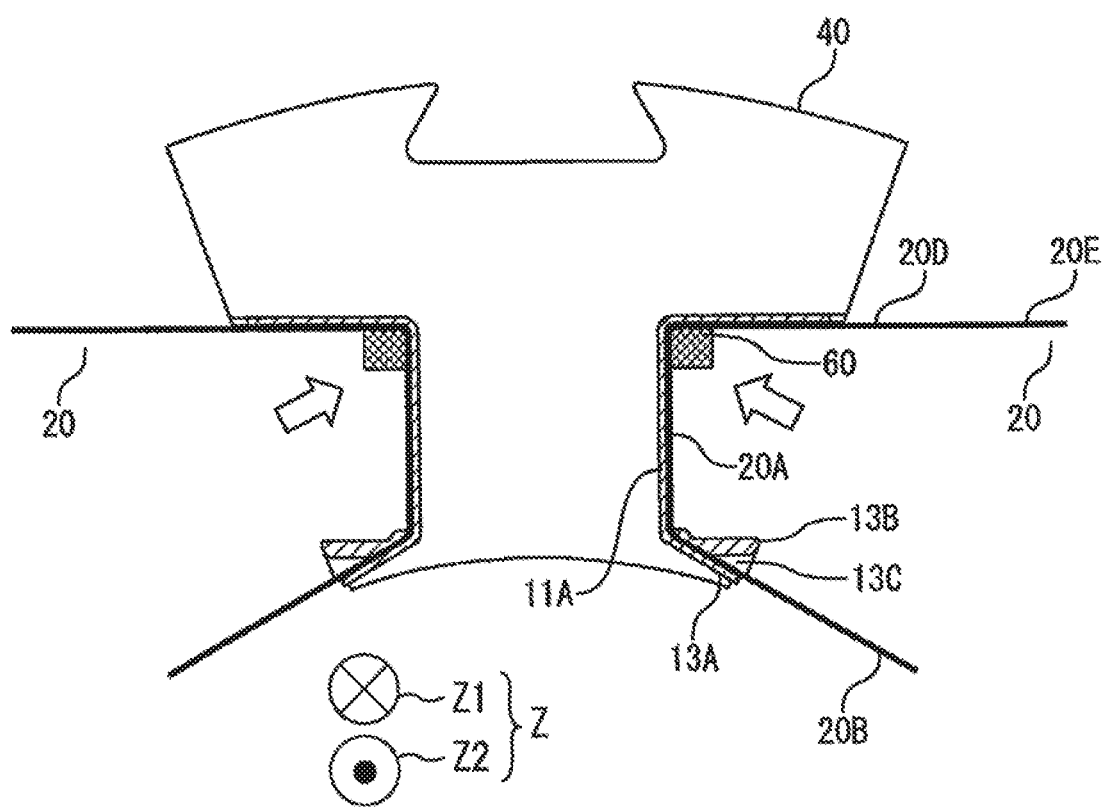
FIG. 10 illustrates the manufacturing process for the magnetic pole in embodiment 1.

When each insulator 20 is attached to the core 40, the insulator 20 is held with the second surface 20B inserted into the slit 13C of the winding frame 10, but as shown in FIG. 9, on the yoke portion 42 side of the core 40, the insulator 20 floats from the core 40. Therefore, as shown in FIG. 10, using an insulator holder 60 which is a dedicated tool, the boundary part between the first surface 20A and the third surface 20C of the insulator 20 is held so as to be in close contact with the core 40.

Figure 11:
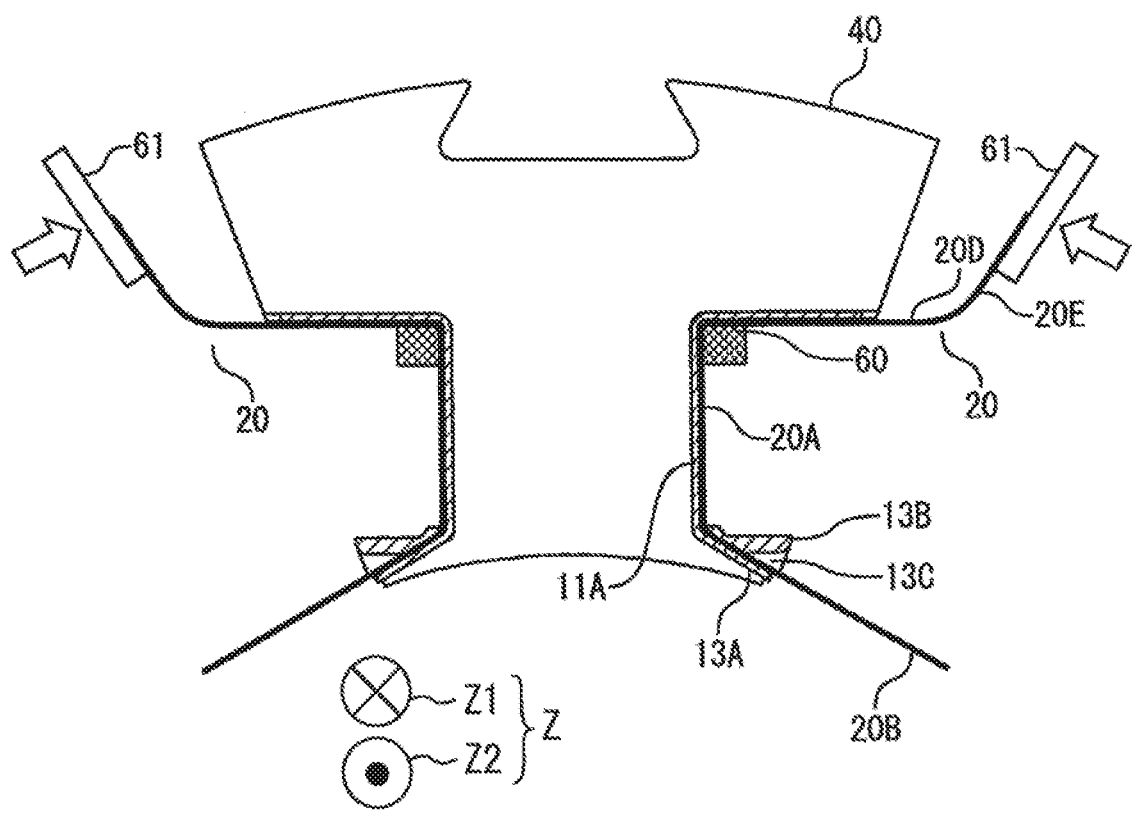
FIG. 11 illustrates the manufacturing process for the magnetic pole in embodiment 1.
Figure 12:
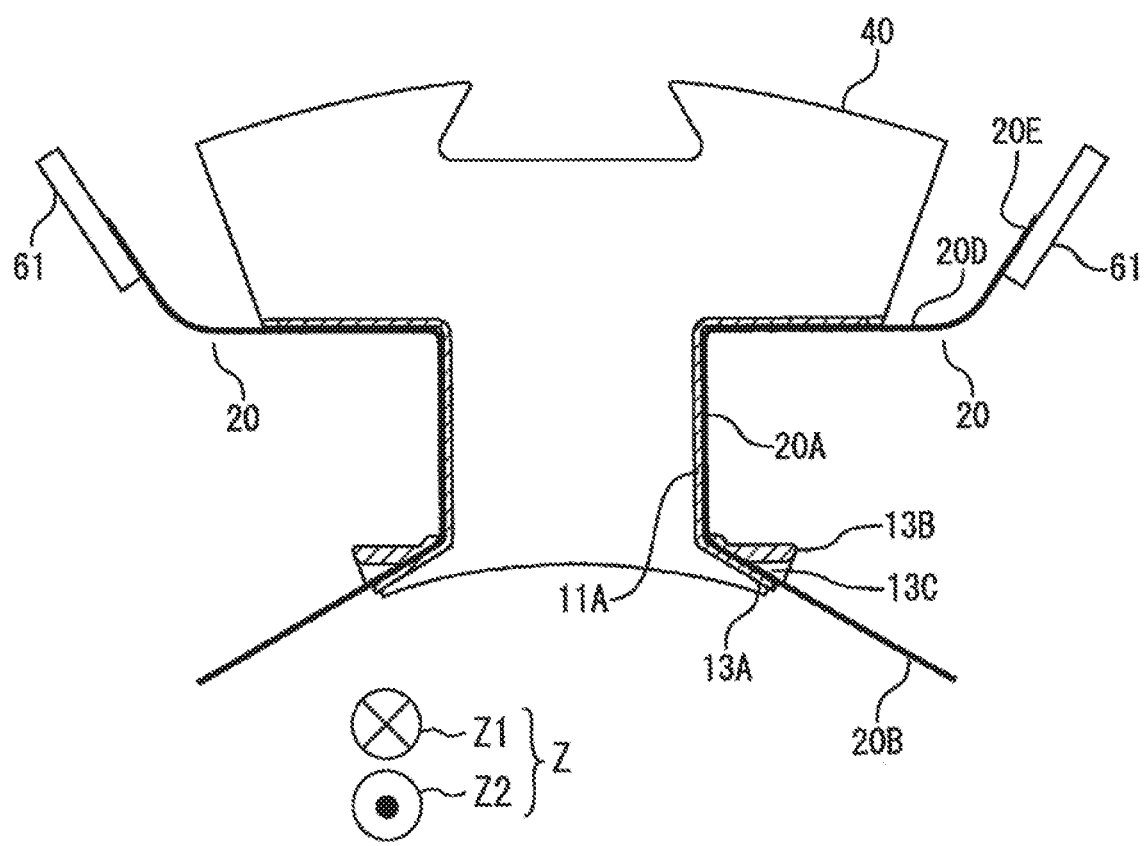
FIG. 12 illustrates the manufacturing process for the magnetic pole in embodiment 1.

Subsequently, as shown in FIG. 11, using an end holder 61 which is a dedicated tool, an outermost part of the fourth surface 20E of each insulator 20 is held so as to be deformed to bend toward the yoke portion 42 side. Thereafter, as shown in FIG. 12, even if the insulator holder 60 is removed, the insulator 20 can be kept in close contact with the core 40 by the end holder 61, and in this state, winding work for the coil 30 is performed. By employing such a winding process, it is possible to obtain a magnetic pole having increased insulation reliability while reducing the cost for manufacturing.

As the winding machine, the spindle winding machine which rotates a work is used, and at this time, the end holders 61 can rotate together with the core 40 from the start of winding until the end of winding. On the other hand, the insulator holders 60 may be mounted to a work conveyance hand provided in the winding machine, for example. The spindle winding machine has been shown as an example of the winding machine, but in the case of using a connection core such as a poki-poki core or a joint-lap core, it is also possible to perform winding by a flyer winding machine, using the same configuration of the winding frames and the insulators as in the present embodiment 1.

A winding process applicable to embodiment 1 of the present invention is not limited to the above-described method. It is also possible to perform winding using a conventional winding machine without the insulator holders 60 and the end holders 61. For example, control may be performed such that, after the core 40, the winding frames 10, and the sheet-like insulators 20 that have not been wound yet are mounted to the winding machine, the first one turn is wound in a state in which the sheet-like insulators 20 are floating from the core 40. In this control, the first one turn is wound so that the coil 30 does not interfere with the sheet-like insulators 20. Once the first one turn is wound, the sheet-like insulators 20 come into close contact with the side surfaces of the tooth portion 41 of the core 40, and therefore, after that, it is possible to progress the winding work without trouble, while performing slight correction for the control.

As described above, according to the present embodiment 1, a process of welding the insulator 20 as in the conventional case is not needed, and thus it is possible to obtain the magnetic pole 50 with increased insulation reliability at low cost.

According to embodiment 1 of the present invention, the magnetic poles 50 form at least a part of the stator 100 of the rotary electric machine and are arranged in an annular shape, and each magnetic pole 50 includes the core 40, the winding frames 10, and the sheet-like insulators 20. The core 40 includes the yoke portion 42, the tooth portion 41, and the end portion 43. The tooth portion 41 is formed to project from the yoke portion 42 in the radially inward direction, i.e., the direction toward the rotation axis of the rotary electric machine. The end portions 43 are arranged on the radially inner side of the tooth portion 41, and extend in the circumferential direction in which the magnetic poles 50 are arranged, from the radially inner ends of the tooth portions 41. The winding frames 10 are fitted to both ends N1, N2 of the core 40 in the axial direction Z parallel to the rotation axis, and have the thin portions 11A, 12A, 13A and the projections 13B. The thin portions 11A, 12A, 13A are each in contact with the surface of the core 40 that faces the space M adjacent in the circumferential direction to the tooth portion 41. Each projection 13B is formed with the gap 13C from the space M side surface of the thin portion 13A, in the space M, and extends in the center-side direction Z1 toward the center in the axial direction Z of the core 40. Each sheet-like insulator 20 makes insulation between the core 40 and the coil 30 wound around the tooth portion 41 and is arranged in the space M, and a part of the sheet-like insulator 20 is arranged in the gap 13C.

As described above, a part of each sheet-like insulator 20 is arranged in the gap 13C between the thin portion 13A and the projection 13B. Therefore, in a state in which the winding frames 10 and the sheet-like insulators 20 are arranged on the core 40 and the coil 30 has not been wound yet, the sheet-like insulators 20 can be fixed to the core 40 and the winding frames 10. Therefore, it is possible to omit a process of adhering or joining the sheet-like insulators 20 to the winding frames 10, and thus the magnetic pole can be manufactured easily and efficiently.

In addition, according to embodiment 1, each winding frame 10 has the trunk portion 11, the first flange 12, and the second flange 13. The trunk portion 11 is fitted to the tooth portion 41. The first flange 12 is formed, near the radially outer end of the tooth portion 41 opposite to the radially inner side, so as to extend from the trunk portion 11, in the separating direction opposite to the center-side direction Z1, and toward both sides in the circumferential direction. The second flange 13 is formed, near the radially inner end of the tooth portion 41, so as to extend from the trunk portion 11 in the separating direction and toward both sides in the circumferential direction.

As described above, each winding frame 10 has the first flange 12 and the second flange 13. Therefore, when the coil 30 is wound around the tooth portion 41 and the winding frames 10 fitted to the core 40, the wound coil 30 can be prevented from being displaced in the radial direction.

In addition, according to embodiment 1, of the surface part of the core 40 that faces the space M, a part in contact with the thin portions 11A, 12A, 13A is recessed in a direction away from the space M by an amount corresponding to the thickness of the thin portions 11A, 12A, 13A as compared to the rest of the surface part.

As described above, of the surface part of the core 40 that faces the space M, a part in contact with the thin portions 11A, 12A, 13A is recessed from the space M adjacent in the circumferential direction to the tooth portion 41, by an amount corresponding to the thickness of the thin portions, as compared to the rest of the surface part. Thus, the rest of the surface of the core 40, and the surfaces of the thin portions 11A, 12A, 13A of the winding frame 10 that face the space M, are formed with no step therebetween in the axial direction Z. Therefore, when the sheet-like insulator 20 is inserted into the gap 13C between the thin portion 13A and the projection 13B of the winding frame 10, the insertion can be smoothly performed without being hampered.

In addition, according to embodiment 1, each winding frame 10 further has the guiding projections 30A, 30B. The guiding projections 30A, 30B are formed, on the winding frame 10, at positions that are near the radially outer end of the tooth portion 41 opposite to the radially inner side and that are in contact with the conductive wire located closest to the core 40 among the conductive wires forming the coil 30, and the guiding projections 30A, 30B position the conductive wire forming the coil 30.

As described above, the guiding projections 30A, 30B position the conductive wire of the coil 30 at the position closest to the core 40. Thus, the winding work can be facilitated.

In addition, according to embodiment 1, each sheet-like insulator 20 covers the coil 30 such that, of the coil 30 wound around the tooth portion 41, a part adjacent in the circumferential direction to the tooth portion 41 is covered from four sides of: a side close to the tooth portion 41 in the circumferential direction; a side far from the tooth portion 41 in the circumferential direction; a radially inner side; and a radially outer side opposite to the radially inner side.

As described above, each sheet-like insulator 20 covers the coil 30 such that, of the coil 30, a part adjacent to the tooth portion 41 is covered from four sides. Therefore, the sheet-like insulators 20 can make insulation not only between the core 40 and the coil 30 in the magnetic pole 50, but also between the coil 30 and a coil of another magnetic pole adjacent in the circumferential direction to the coil 30.

In addition, according to embodiment 1, the stator 100 includes the magnetic poles 50 and forms a part of the rotary electric machine.

Owing to the configuration as described above, in a state in which the winding frames 10 and the sheet-like insulators 20 are arranged on the core 40 and the coil 30 has not been wound yet, the sheet-like insulator 20 can be fixed to the core 40 and the winding frames 10. Therefore, it is possible to omit a process of adhering or joining the sheet-like insulators 20 to the winding frames 10, and thus the stator can be manufactured easily and efficiently.

Hereinafter, in the description in embodiment 2 and later, some of parts corresponding to matters that have been already described in embodiment 1 will not be described. In the case where only a part of a configuration is described, the other part of the configuration is the same as in embodiment 1.

Embodiment 2

Figure 13:
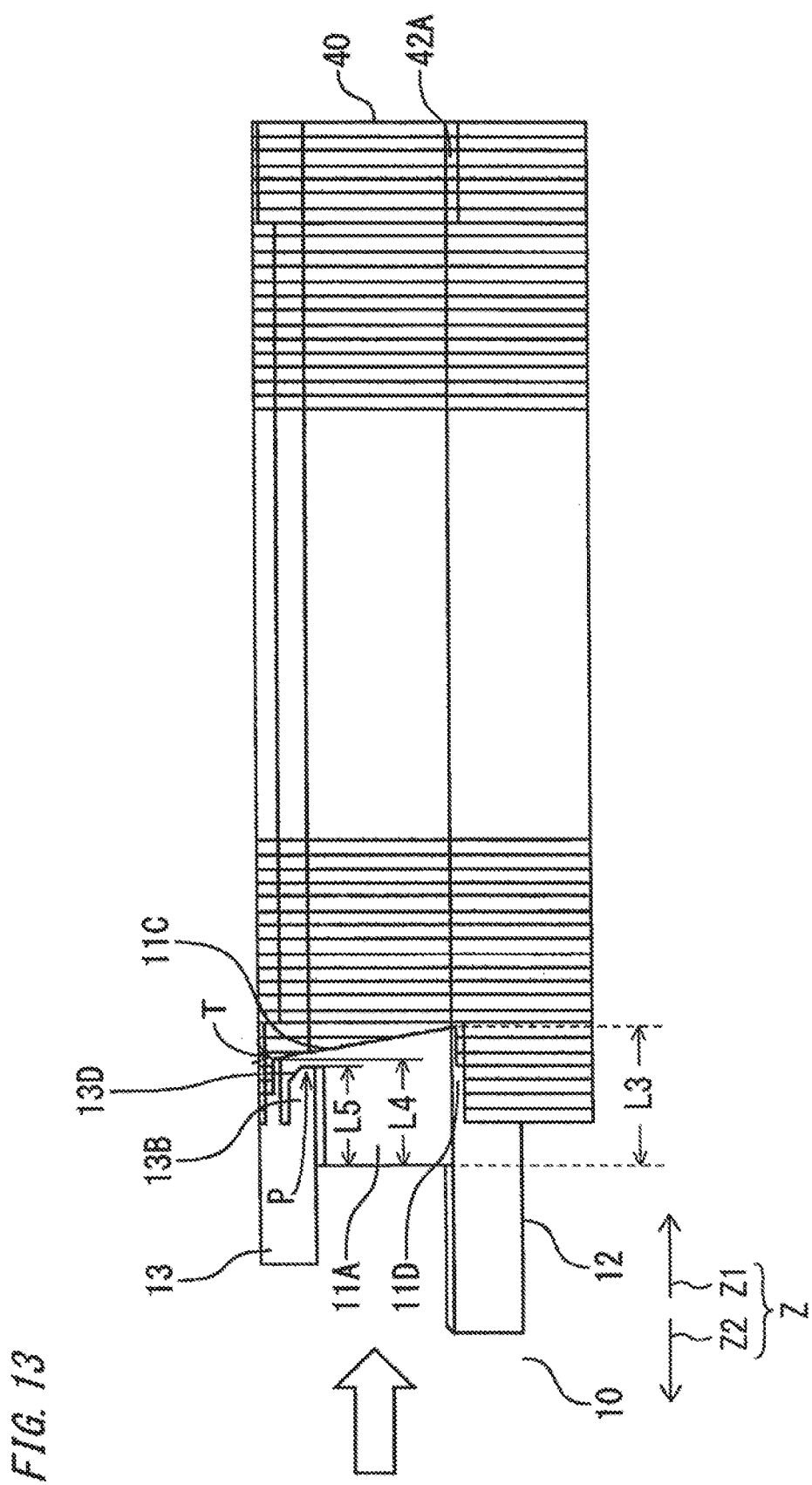
FIG. 13 shows attachment of an insulator to a core in embodiment 2.

Next, embodiment 2 will be described. In the present embodiment 2, the configuration of the winding frame 10 is partially different from that in embodiment 1. Hereinafter, description will be given with reference to FIG. 13 to FIG. 16. FIG. 13 is a sectional projection view showing a state in which one winding frame 10 is attached to the core 40. In FIG. 13, a length L5 of the projection 13B formed at the second flange 13 of the winding frame 10 is shorter than a length L4 of the thin portion 11A of the trunk portion 11. A difference L4-L5 therebetween is, for example, 2 mm to 5 mm.

A chamfer 13D is formed at an end part of the projection 13B that is opposed to the thin portions 11A, 13A. Further, the thin portion 11A has a taper 11C formed from the first flange 12 having a length L3 toward the second flange 13 having a length L4, and a step 11D is formed at a part that is on the end side of the thin portions 11A, 12A, 13A and on the core 40 side. In the case where the thickness of the insulator 20 is 0.25 mm, the width dimension of the slit 13C shown in FIG. 4 in embodiment 1 is set at 0.3 mm to 0.4 mm. The taper 11C is a sloped end formed on the thin portion 11A, and is sloped with respect to a line perpendicular to the axial direction Z in a plane parallel to the thin portion 11A. The taper 11C may be referred to as "sloped end 11C". Of the sloped end 11C, an end part positioned closest to the separating direction Z2 side is referred to as "shortest end T". Of the end part of the thin portion 11A of the trunk portion 11, the shortest end T is at the shortest distance from the end in the separating direction Z2 of the trunk portion 11. In the axial direction Z, the shortest end T is positioned closer to the center-side direction Z1 side as compared to a projection end portion P which is closest to the center-side direction Z1 side, of the projection 13B.

Figure 14:
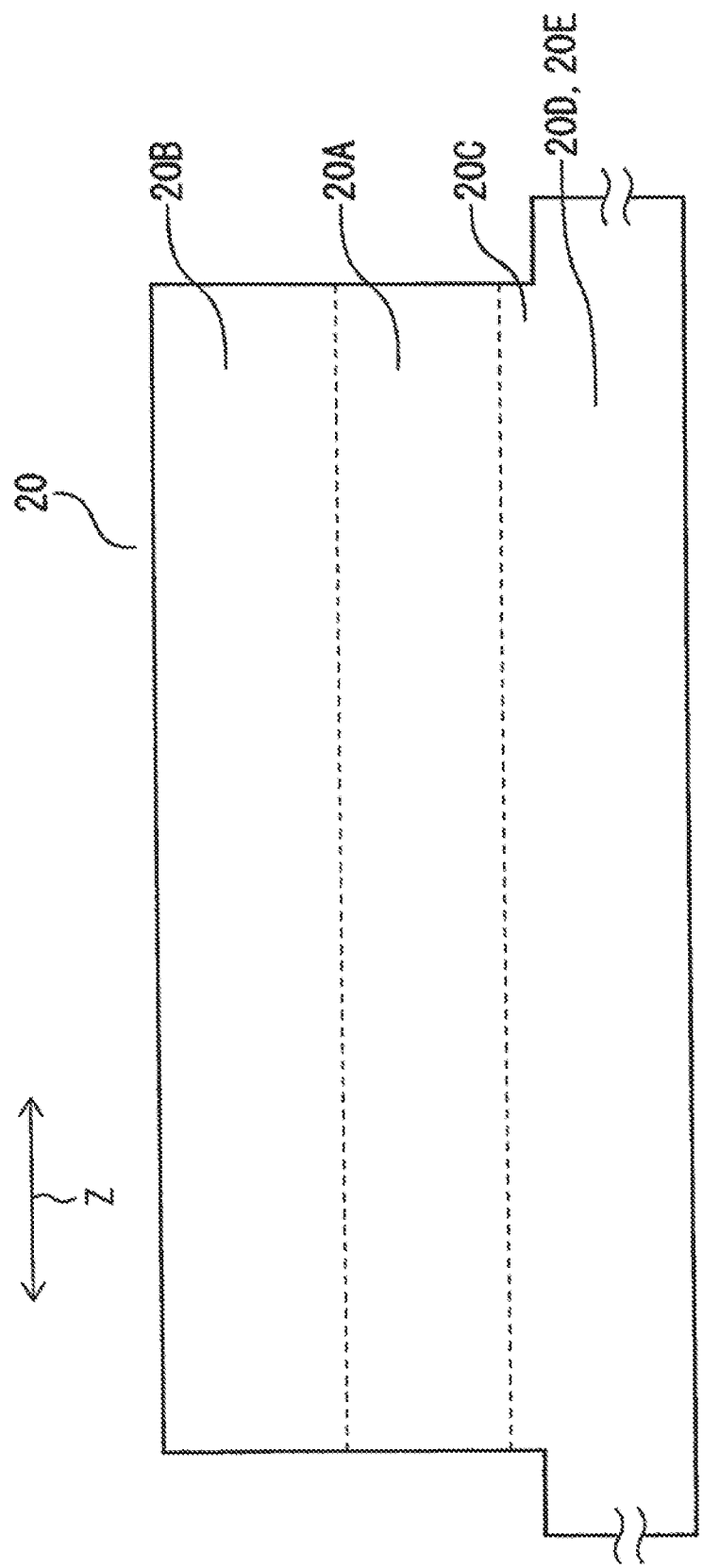
FIG. 14 is a plan view showing the insulator in embodiment 2.
Figure 15:
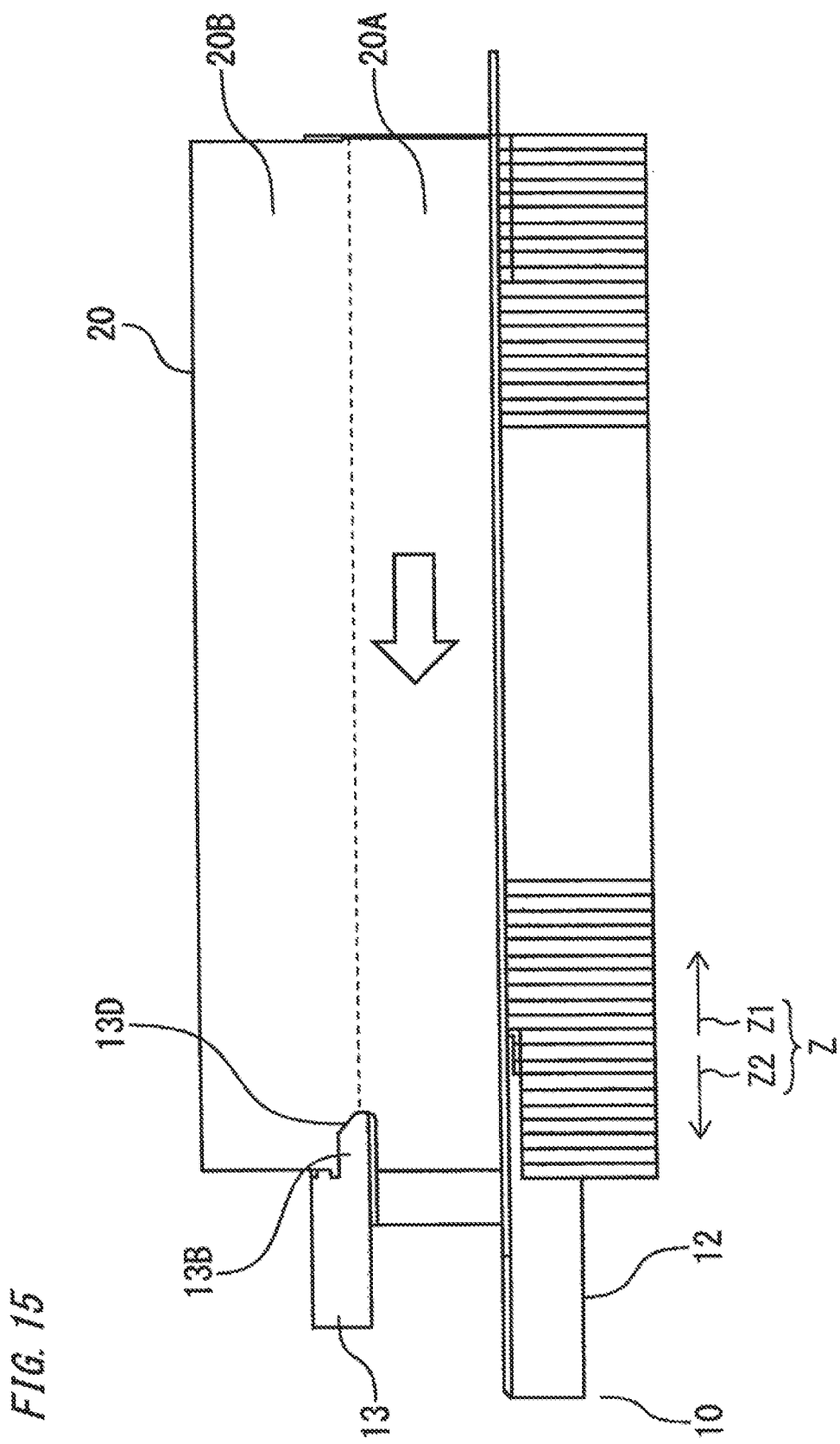
FIG. 15 shows attachment of the insulator to the core in embodiment 2.

Next, a mounting process for the winding frame 10, the core 40, and the insulator 20 will be described. As shown in FIG. 13, one winding frame 10 is mounted to the core 40. FIG. 14 is a plan view of the insulator 20 to be used in the next step. The insulator 20 is the same as shown in FIG. 6 in embodiment 1, and dotted lines indicate folding positions. Next, as shown in FIG. 15, while the insulator 20 is in close contact with the core 40, the insulator 20 is slid in the axial direction Z from right to left in the drawing and thus inserted into the slit 13C of the winding frame 10.

The length of the projection 13B is shorter than the length of the thin portion 11A. Therefore, when the sheet-like insulator 20 is inserted while being pressed against the thin portion 11A, the thin portion 11A serves as a guide for insertion of the sheet-like insulator 20, and thus insertion of the sheet-like insulator 20 is facilitated. Similarly, at the same time, since the chamfer 13D is formed at the end of the projection 13B, this serves as a guide when the sheet-like insulator 20 floats from the thin portion 11A, and thus insertion of the insulator 20 is further facilitated.

Figure 16:
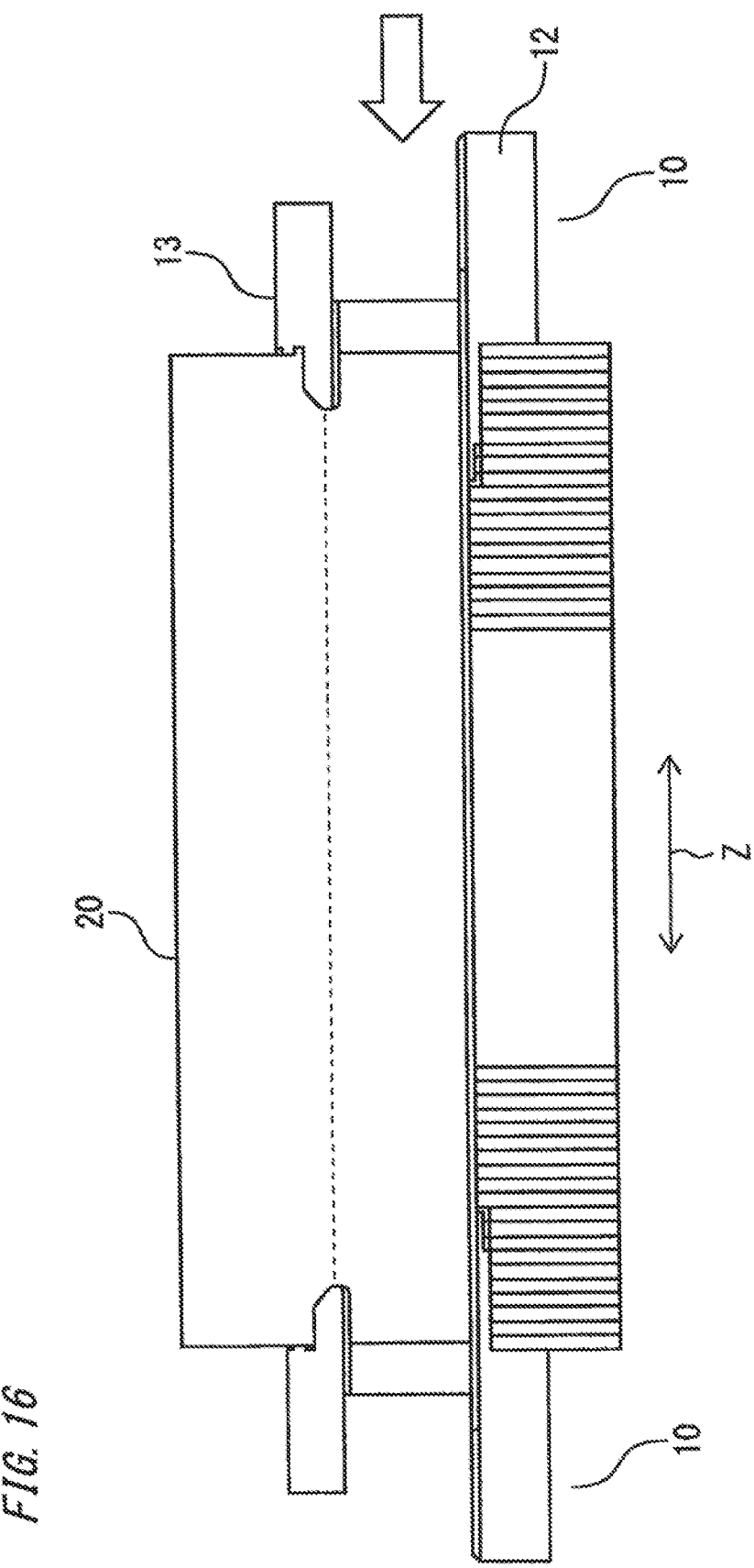
FIG. 16 shows attachment of the insulator to the core in embodiment 2.

Thereafter, as shown in FIG. 16, the other winding frame 10 is mounted to the core 40 while the thin portion 11A is inserted between the tooth step portion 41A of the core 40 and the insulator 20, from the right side in the drawing. At this time, the insertion is performed so that the insulator 20 is located in the slit 13C. Thereafter, winding is performed by a winding machine to form the coil 30, whereby the magnetic pole 50 is obtained. By employing such a winding process, it is possible to obtain the magnetic pole 50 having increased insulation reliability while reducing the cost for manufacturing.

As described above, in the present embodiment 2, since the length of the projection 13B is shorter than those of the thin portions 11A, 12A, 13A and the chamfer 13D is formed, it is possible to slide the insulator 20 while the insulator 20 is placed on the thin portion 11A, and thus the thin portions 11A, 12A, 13A serve as guides for the insulator 20. Further, since the chamfer 13D is formed on the projection 13B, the chamfer 13D serves as a guide to facilitate insertion of the insulator 20. Further, the taper 11C is formed from the first flange 12 toward the second flange 13.

That is, the thin portion 11A is formed such that the length on the first flange 12 side is longer than that on the second flange 13 side, and thus the end of the thin portion 11A is shaped as the taper 11C, which serves as a guide when the winding frame 10 is mounted from the yoke portion 42 side of the core 40, thereby facilitating the mounting. In addition, since the step 11D is formed, the winding frame 10 is downsized by an amount corresponding to the step, the mounting is facilitated, and workability at the time of mounting the winding frame 10 to the core 40 is improved.

In the present embodiment 2, an example in which the step 11D is formed at the end of the thin portion 11A has been shown. However, the thin portion 11A may be formed in a taper shape such that the thickness decreases toward the end, and also in this case, the same effect is obtained. Also, the chamfer shape at the end of the projection 13B is not limited. The same effect is obtained as long as the width of the slit 13C in which the insulator 20 is located is wider at the end of the projection 13B and narrower on the base side thereof.

According to embodiment 2 of the present invention, the thin portion 11A has the sloped end 11C. The sloped end 11C is formed on at least a part of the thin portion 11A, and is sloped with respect to a line perpendicular to the axial direction Z in a plane parallel to the surface of the core 40 that faces the space M. Of the thin portion 11A, an end positioned closest to the center-side direction side connects to the sloped end 11C.

As described above, since the sloped end 11C is formed on the thin portion 11A and the end of the thin portion 11A that is positioned closest to the center-side direction Z1 side connects to the sloped end 11C, the sloped end 11C can guide the core 40 when the winding frame 10 is fitted to the core 40. Thus, work for fitting the winding frame 10 to the core 40 can be facilitated.

In addition, according to embodiment 2, the shortest end T of the thin portion 11A is positioned closer to the center-side direction Z1 side than the projection end portion P of the projection 13B. Of the end portion in the center-side direction Z1 of the thin portion 11A, the shortest end T is positioned closest to the separating direction side opposite to the center-side direction Z1 side. Of the projection 13B, the projection end portion P is positioned closest to the center-side direction Z1 side.

As described above, the shortest end T of the thin portion 11A is positioned closer to the center-side direction Z1 side than the projection end portion P of the projection 13B. Thus, the end of the sheet-like insulator 20 inserted into the gap 13C between the thin portion 11A and the projection 13B can be located in contact with the thin portion 11A, on the winding frame 10 side with respect to the boundary between the thin portion 11A and the core 40. Therefore, the sheet-like insulator 20 can be smoothly inserted without being hampered.

In addition, according to embodiment 2, the chamfer 13D is formed at the projection end portion P positioned closest to the center-side direction Z1 side, of the projection 13B. The chamfer 13D is sloped with respect to a line perpendicular to the axial direction Z in a plane parallel to the surface of the core 40 that the projection 13B faces.

As described above, the chamfer 13D is formed at the projection end portion P. Therefore, when the sheet-like insulator 20 is inserted into the gap 13C between the thin portion 11A and the projection 13B, the projection end portion P is less likely to hamper the insertion.

Embodiment 3

Figure 17:
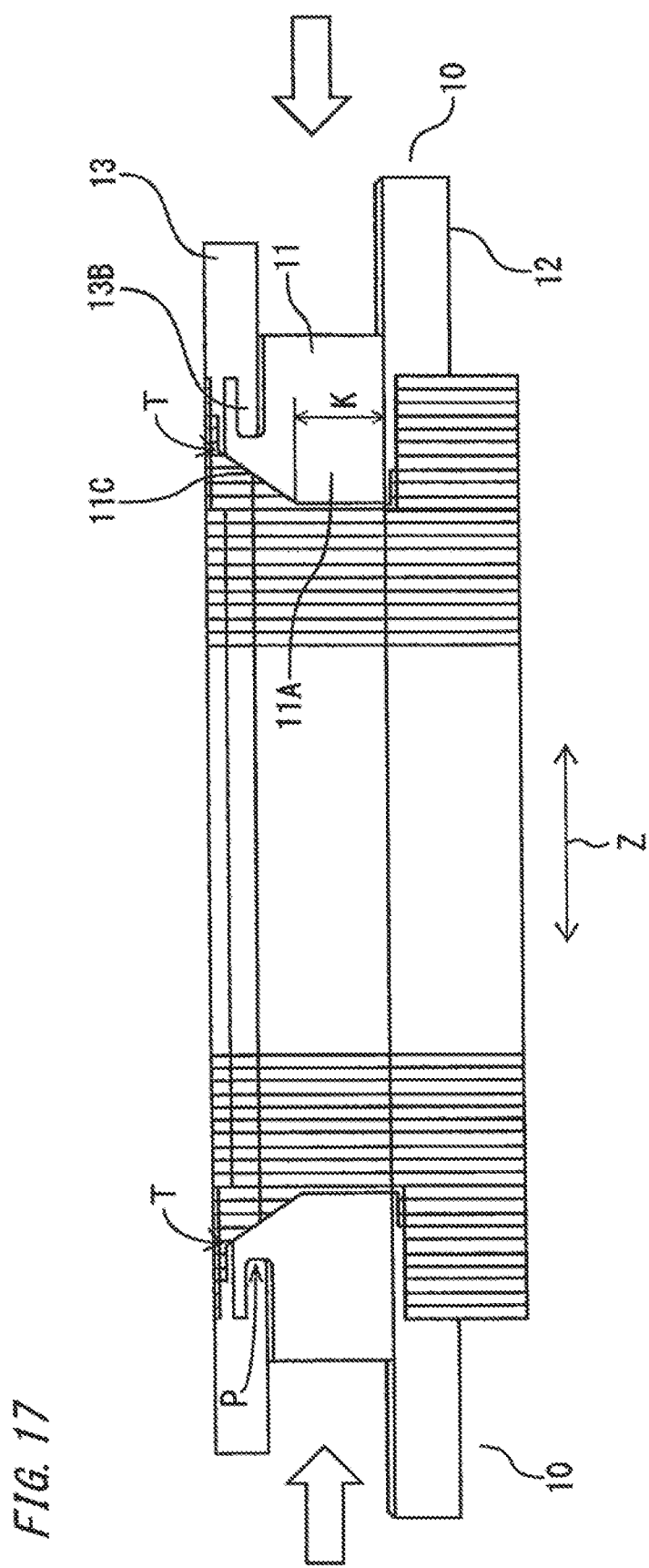
FIG. 17 shows attachment of an insulator to a core in embodiment 3.
Figure 18:
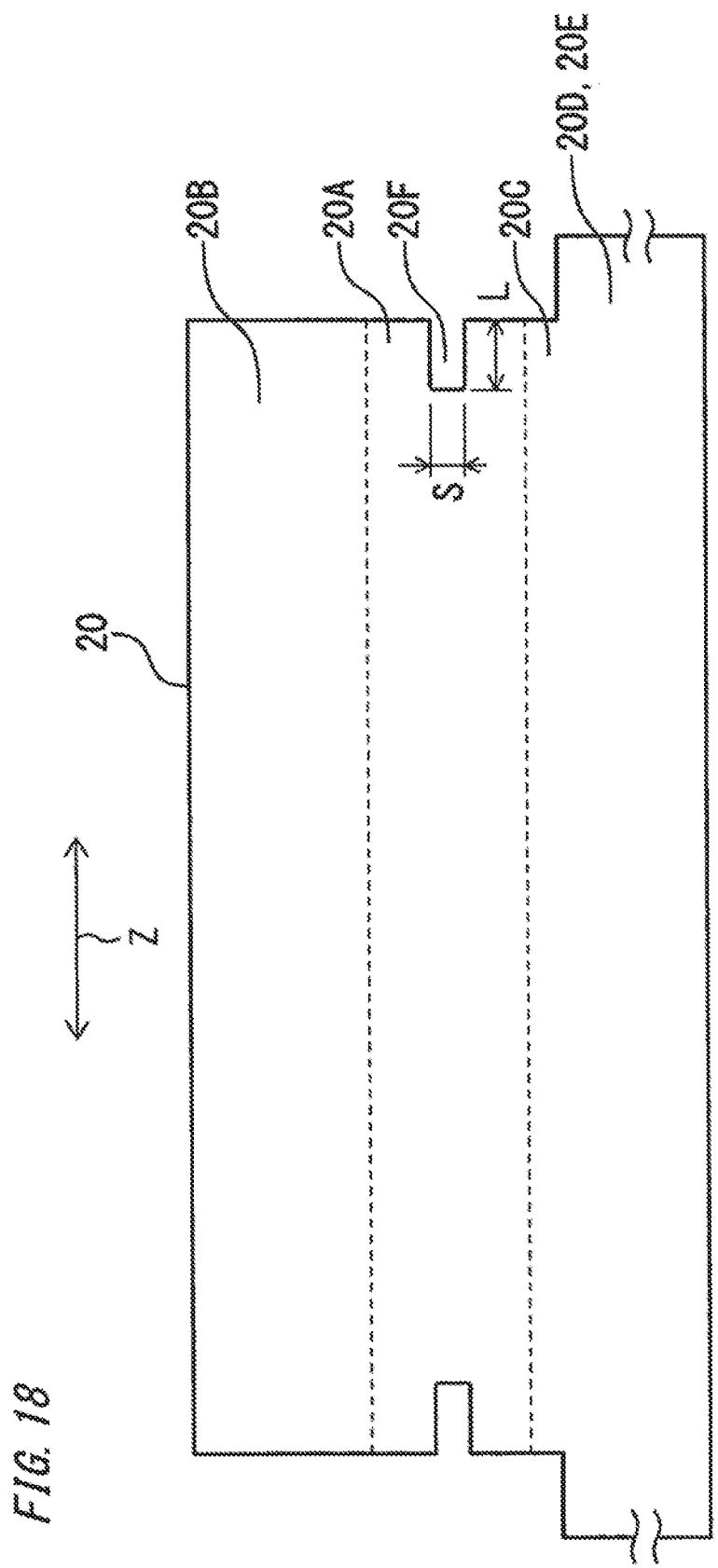
FIG. 18 is a plan view showing the insulator in embodiment 3.
Figure 19:
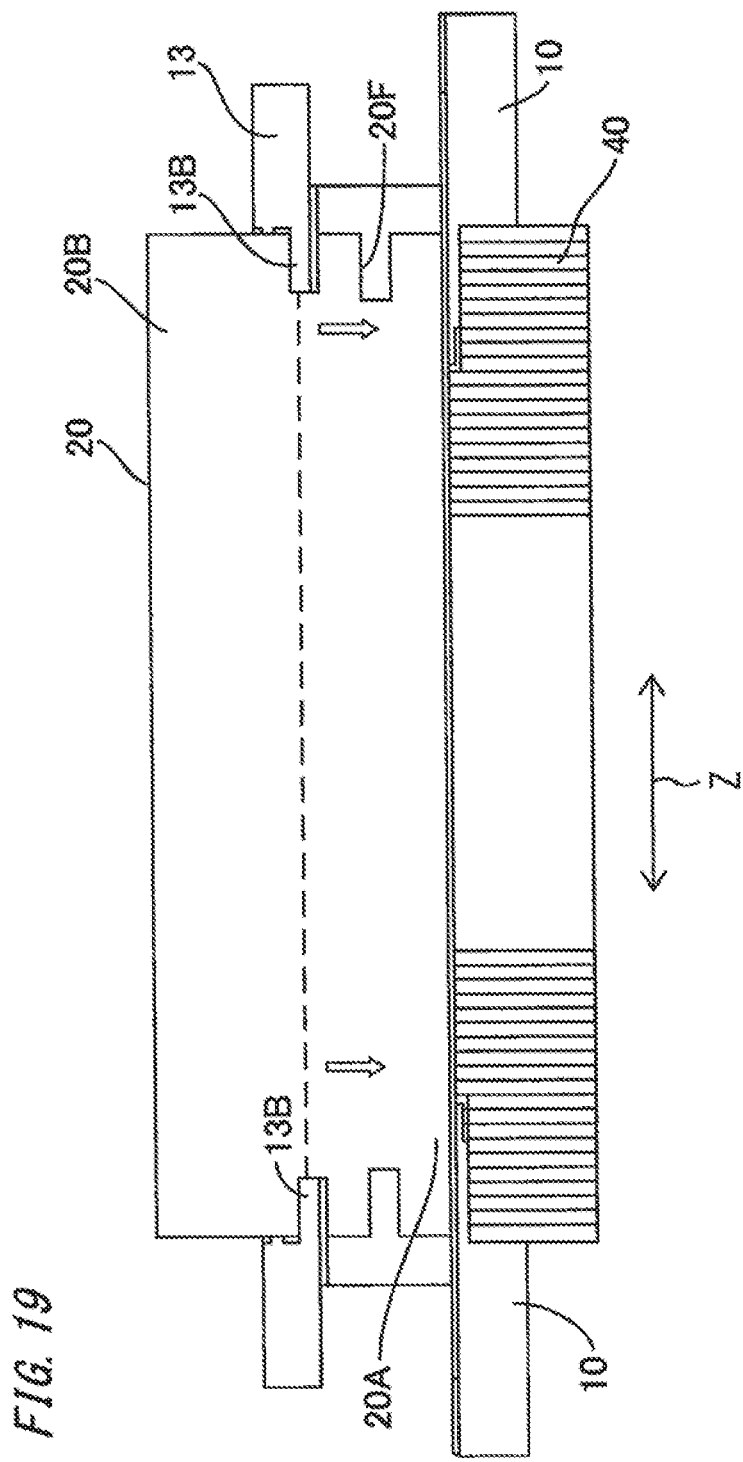
FIG. 19 shows attachment of the insulator to the core in embodiment 3.

Next, the winding frame 10 and the insulator 20 in embodiment 3 will be described with reference to FIG. 17 to FIG. 19. As shown in the drawings, in the present embodiment 3, the winding frame 10 has, at the thin portion 11A, a taper 11C which is formed from a position separate by a predetermined dimension K from the first flange 12 side, and cutouts 20F are formed in the first surface 20A of the insulator 20.

A width S and a depth L of each cutout 20F may be set to such dimensions as to allow the projection 13B of the winding frame 10 to pass therethrough, and the position thereof may be at any position in the first surface 20A of the insulator 20. In addition, since the insulator 20 having the cutouts 20F is employed, in order to ensure a sufficient insulation creeping distance, the start point of the taper 11C of the thin portion 11A of the trunk portion 11 is set at a position separate by the predetermined dimension K from the first flange 12. In embodiment 3, the width S of each cutout 20F is constant in the axial direction Z from around the bottom that defines the cutout 20F from the center-side direction Z1 side, to around the end in the separating direction Z2 of the sheet-like insulator 20.

Next, a mounting process for the winding frame 10, the core 40, and the insulator 20 will be described. First, as shown in FIG. 17, a pair of winding frames 10 are mounted to the core 40. From this state, the insulator 20 having the cutouts 20F shown in FIG. 18 is moved so that, as shown in FIG. 19, the projections 13B pass through the cutouts 20F, and then the position of the insulator 20 is shifted in the radial direction, i.e., from the second flange 13 side to the first flange 12 side in FIG. 19, whereby mounting of the winding frames 10 and the insulator 20 to the core 40 is completed.

As described above, according to the present embodiment 3, it is possible to mount the insulator 20 after a pair of winding frames 10 are both mounted to the core 40. Therefore, the mounting work is facilitated and the time for mounting work can be shortened. It is noted that the radial-direction position of each cutout 20F may be on a side close to the first flange 12 so as to have an advantage in terms of insulation creeping distance, or may be near the center of the first surface 20A from the perspective of mounting workability.

According to embodiment 3 of the present invention, the sheet-like insulator 20 has, at both ends in the axial direction Z, cutouts 20F recessed in the center-side direction Z1. The position in the axial direction Z of the bottom that defines each cutout 20F from the center-side direction Z1 side is closer to the center-side direction Z1 side than the projection end portion P which is positioned closest to the center-side direction Z1 side, of the projection 13B. The width S of each cutout 20F in a direction perpendicular to the axial direction Z is set to be greater than the minimum outer diameter of the projection 13B in a plane perpendicular to the axial direction Z.

As described above, the bottom of each cutout 20F formed in the sheet-like insulator 20 is positioned closer to the center-side direction Z1 side than the projection end portion P, and the width S of the cutout 20F is greater than the minimum outer diameter of the projection 13B. Therefore, it is possible to pass the projection 13B through each cutout 20F by moving the sheet-like insulator 20 in a direction perpendicular to the axial direction Z. Therefore, it is possible to arrange an end of the sheet-like insulator 20 into the gap 13C between the thin portion 13A and the projection 13B by inserting the sheet-like insulator 20 in a direction perpendicular to the axial direction Z. Thus, the arrangement of the sheet-like insulator 20 can be performed smoothly.

Embodiment 4

Figure 20:
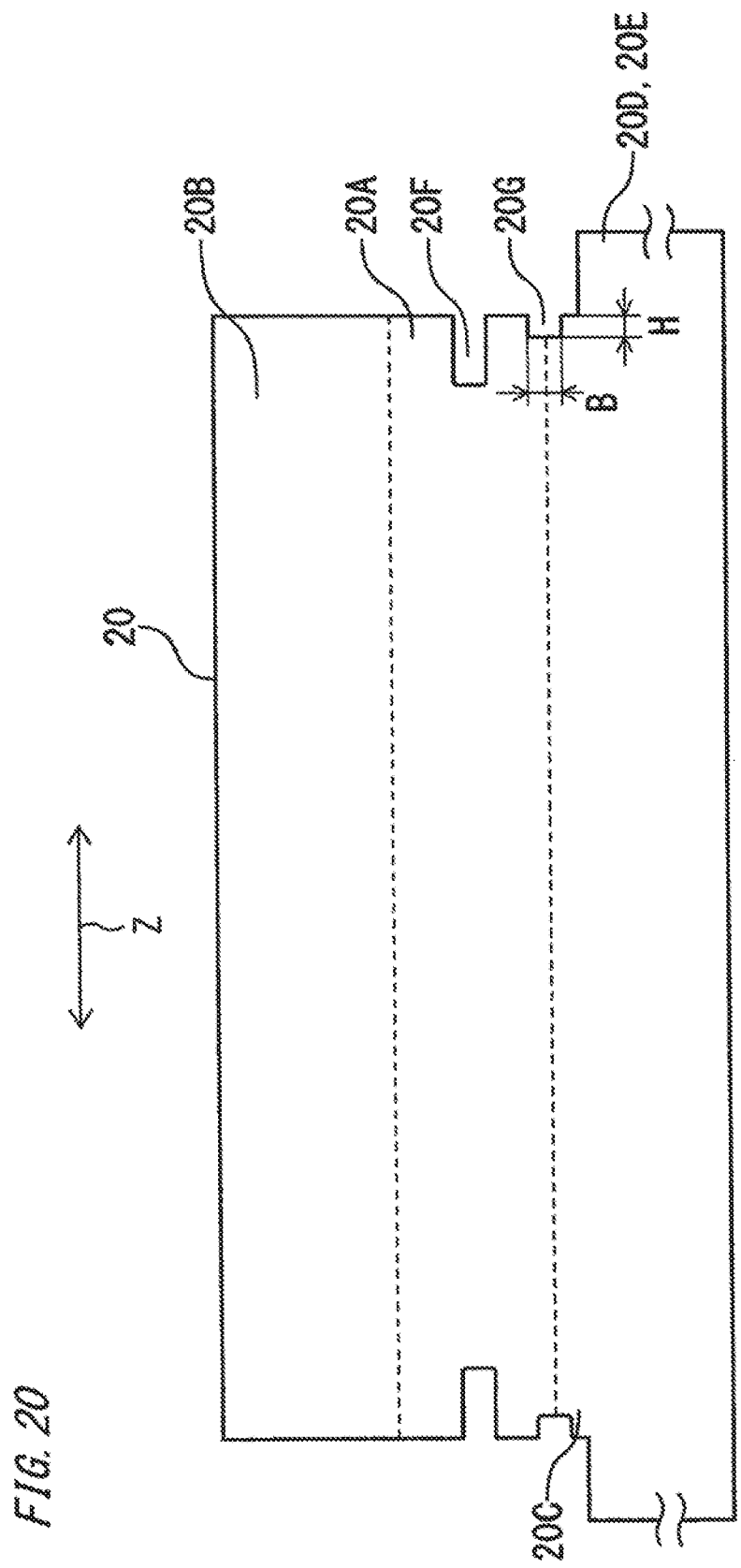
FIG. 20 is a plan view showing an insulator in embodiment 4.

Next, FIG. 20 shows an insulator 20 in embodiment 4. In FIG. 20, the insulator 20 has cuts 20G at both ends in the axial direction Z (longitudinal direction) at the boundary between the first surface 20A and the third surface 20C. A width B and a depth H of each cut 20G may be set to such dimensions as to accommodate two wires of the conductor of the coil 30. Owing to this configuration, even if the insulator 20 mounted to the core 40 slightly floats, the insulator 20 is corrected in a direction to be in close contact with the core 40 by a tension at the time of winding, and the conductor can be initially placed at a correct position, resulting in an effect of obtaining the coil 30 that is regularly wound. It is noted that the cutouts 20G may be provided to the insulator 20 shown in FIG. 14 to FIG. 16.

Embodiment 5

Figure 21:
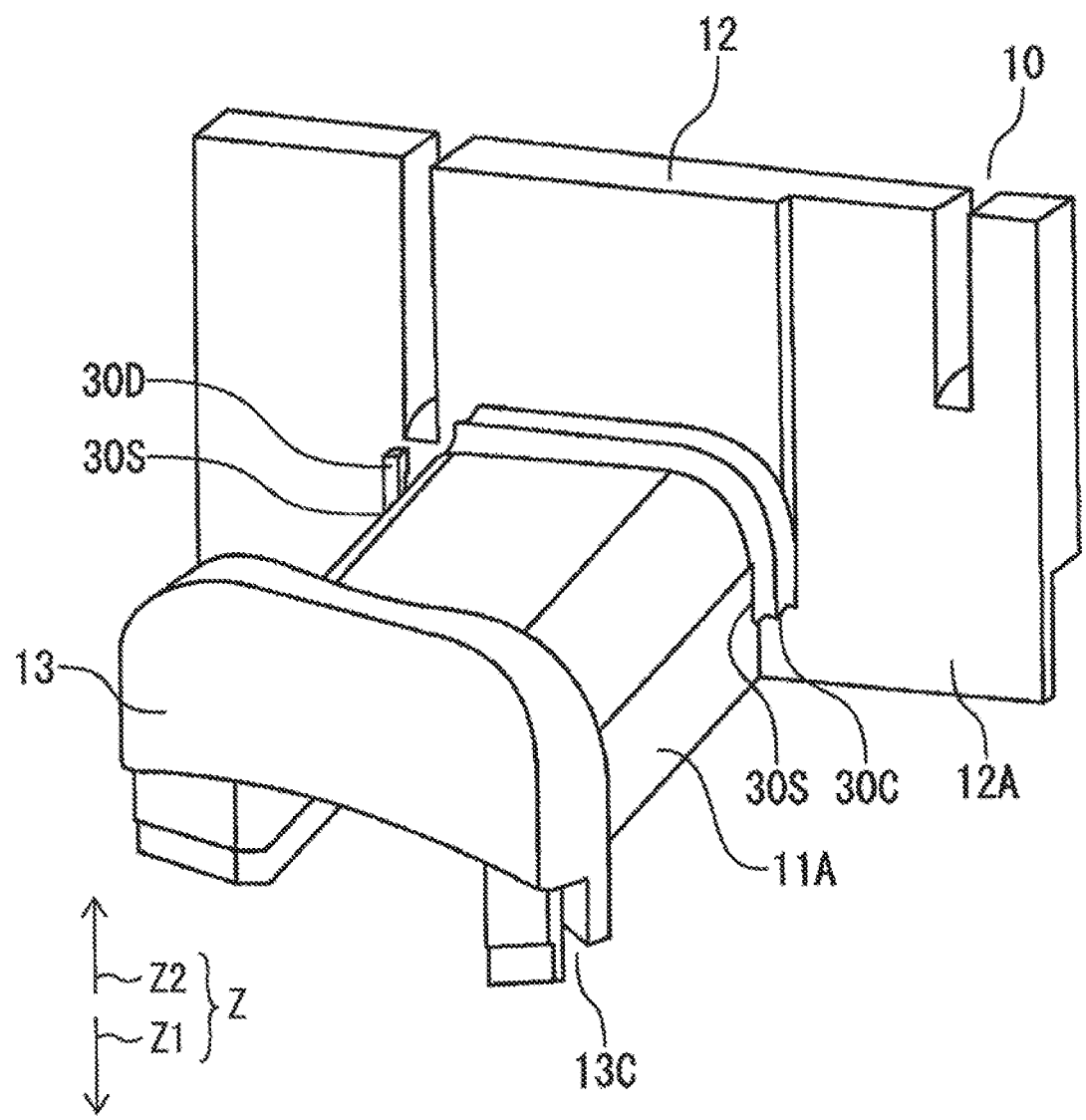
FIG. 21 is a perspective view of a winding frame in embodiment 5.
Figure 22:
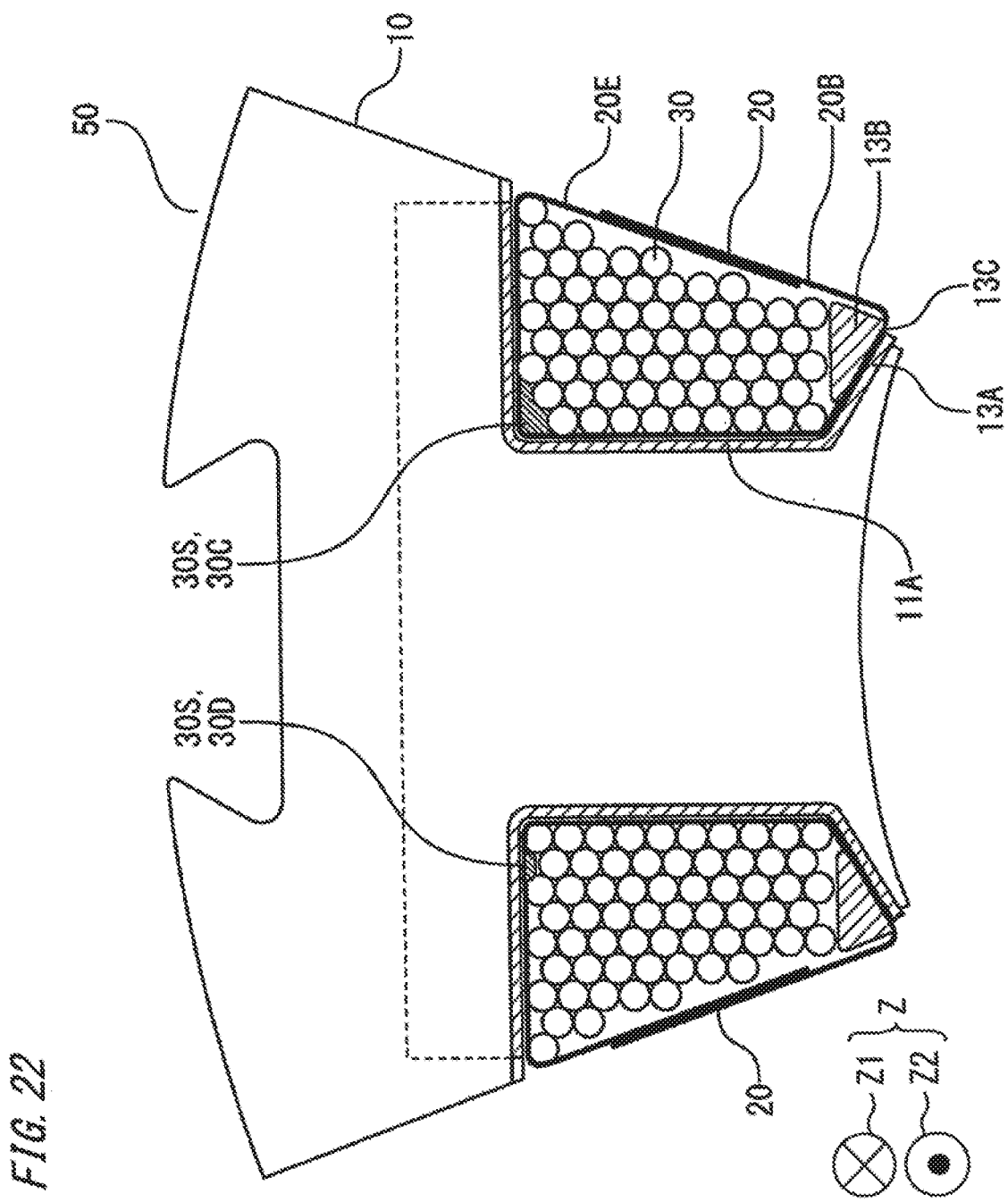
FIG. 22 is a sectional view of a magnetic pole in embodiment 5.

Regarding the winding frame 10 shown in FIG. 4 in embodiment 1 described above, an example has been shown in which the dummy coils 30A, 30B are shaped so as not to extend into the slot M which is the space M surrounded by the tooth portion side surface 41B, the yoke portion side surface 42B, and the end portion 43 of the core 40. In the present embodiment 5, as shown in FIG. 21, on the winding frame 10, a dummy coil 30C and a dummy coil 30D are formed so as to extend into the slot M, and slits 30S are formed between the dummy coils and the thin portions 11A, 12A so as to allow the insulator 20 to be located in the slits 30S. FIG. 22 shows a sectional view of a magnetic pole 50 in the present embodiment 5. Thus, since the insulator 20 is located in the slits 30S, the insulator 20 can be held at a total of four locations including the slits 13C, whereby winding work is facilitated.

Embodiment 6

Figure 23:
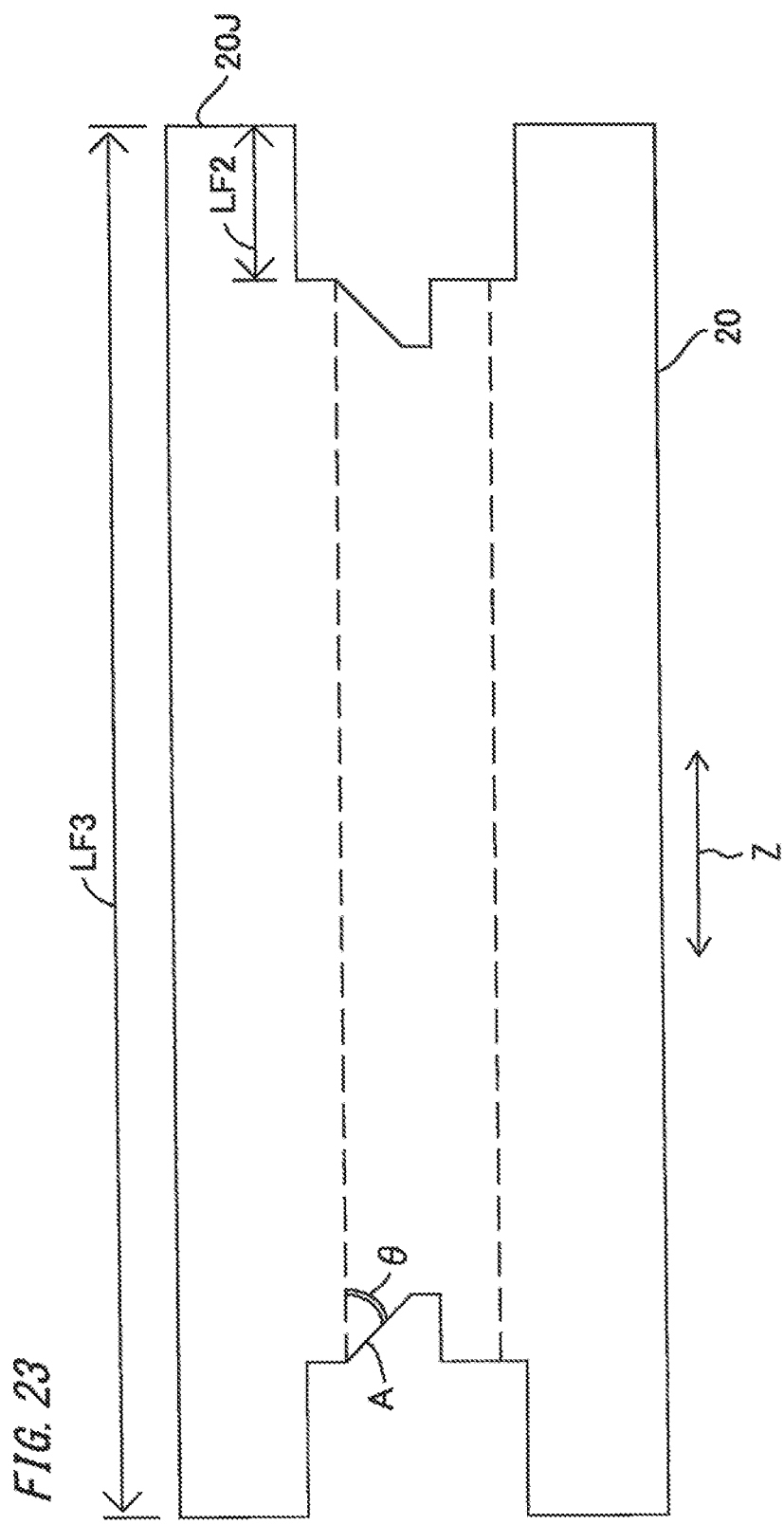
FIG. 23 is a plan view of a sheet-like insulator in embodiment 6.
Figure 24:
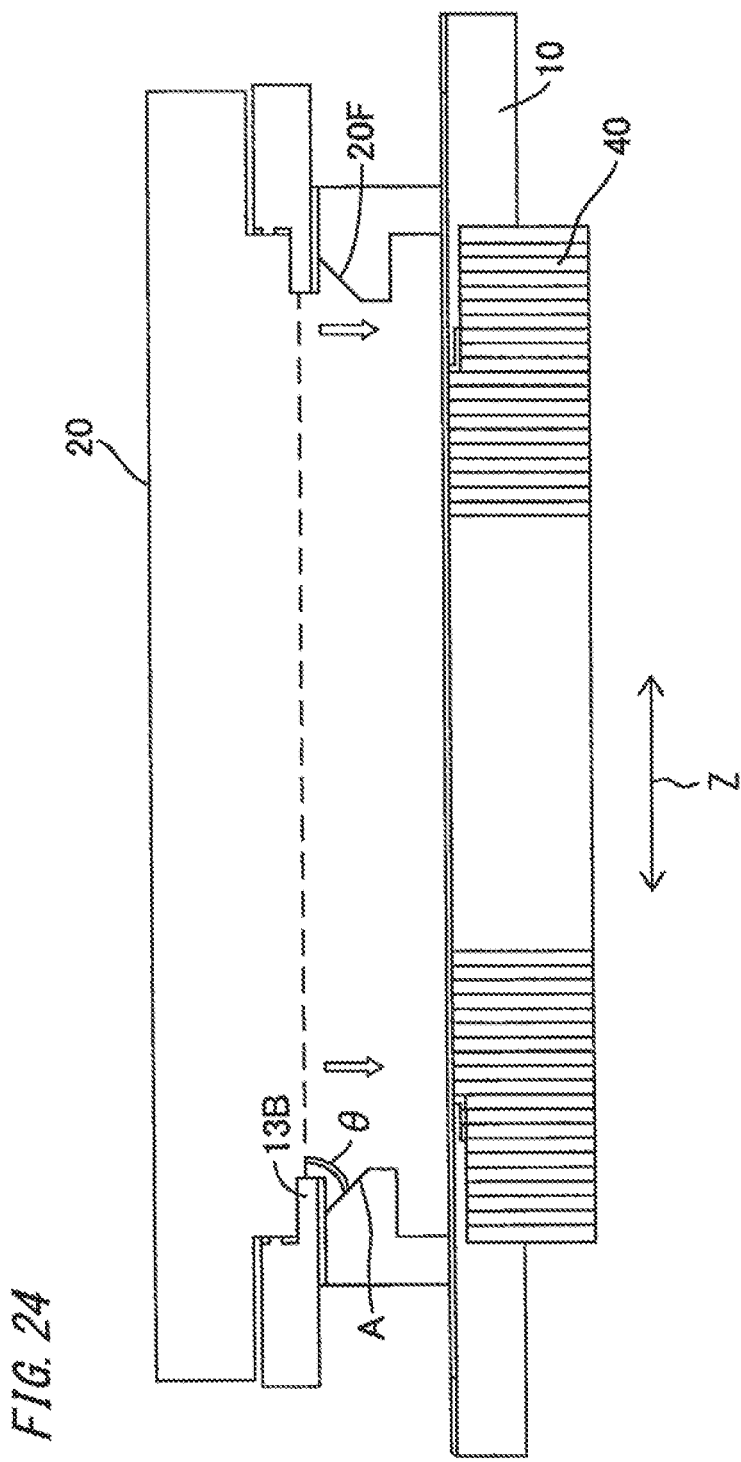
FIG. 24 illustrates operation for attaching the sheet-like insulator to winding frames in embodiment 6.

Next, a sheet-like insulator 20 in embodiment 6 will be described with reference to FIG. 23 and FIG. 24. FIG. 23 is a plan view of the sheet-like insulator 20 in embodiment 6 of the present invention. FIG. 24 illustrates operation at the time of attaching the sheet-like insulator 20 to the winding frames 10 in embodiment 6 of the present invention. The present embodiment 6 is similar to embodiment 3. Embodiment 6 is different from embodiment 3 in the shape of the cutouts 20F formed in the first surface 20A of the sheet-like insulator 20. As shown in FIG. 24, a side A is formed to form an angle θ with respect to the extension direction of the projection 13B, i.e., the stacking direction Z of the core 40.

Here, when the sheet-like insulator 20 is mounted to the core 40 to which the winding frames 10 are mounted at both ends N1, N2 in the axial direction Z, since the side A passing through the gap 13C formed between the projection 13B and the thin portion 11A forms the angle θ with respect to the extension direction of the projection 13B, the side A can pass smoothly without being caught on the projection 13B. As a result, the time for mounting the sheet-like insulator 20 can be shortened and the manufacturing cost can be reduced.

Figure 25:
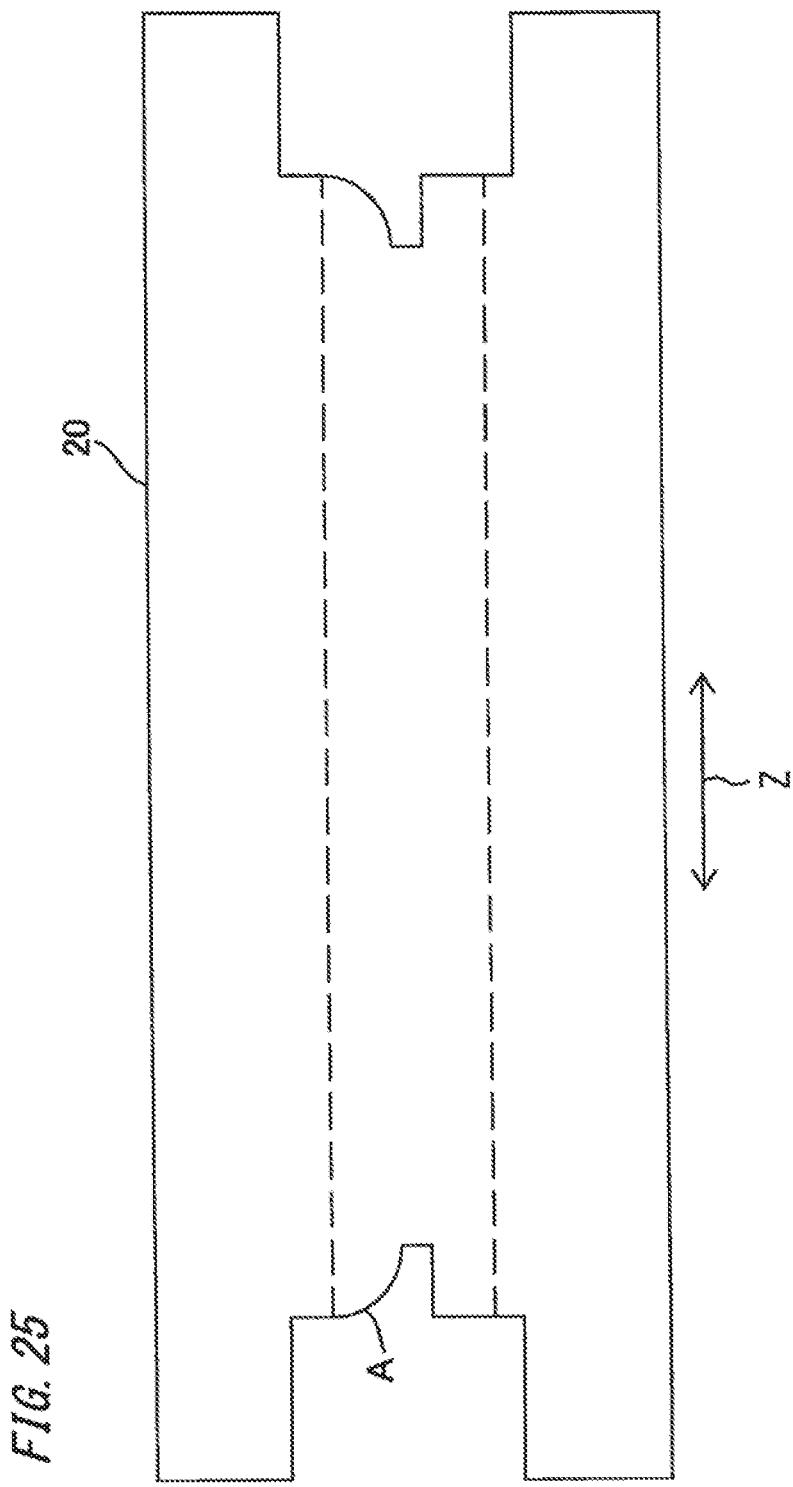
FIG. 25 is a plan view of a sheet-like insulator in a modification of embodiment 6.

In order not to decrease insulation reliability due to increase in cutout area, it is desirable to ensure that the distance where the sheet-like insulator 20 overlaps the ends of the thin portions 11A, 13A is equal to or greater than a necessary insulation creeping distance. It is noted that FIG. 23 and FIG. 24 show an example in which the angle θ between the stacking direction Z of the core 40 and the side A is 45 degrees. However, as the angle θ decreases, it usually becomes more difficult to ensure the insulation creeping distance. Therefore, it is desirable that the angle θ is in a range of 30 degrees<θ<60 degrees. The side A may not necessarily be a straight line. FIG. 25 is a plan view of the sheet-like insulator 20 in a modification of embodiment 6 of the present invention. For example, as shown in FIG. 25, the side A may be formed in a curve shape, and also in this case, the same effect as described above is obtained.

In embodiment 6, as shown in FIG. 23 and FIG. 24, an extension surface 20J similar to the fourth surface 20E in embodiment 1 is provided to the second surface 20B of the sheet-like insulator 20. The extension length in the axial direction Z of the extension surface 20J is an axial-direction length LF2 which is the same as that of the fourth surface 20E in embodiment 1, and the entire axial-direction length of the second surface 20B provided with the extension surface 20J is an axial-direction length LF3 which is the same as that of the fourth surface 20E in embodiment 1. In this configuration, the extension surface 20J provided to the second surface 20B and the fourth surface 20E are folded to overlap each other, thereby obtaining an effect of improving reliability of insulation between the coils of the adjacent magnetic poles.

According to embodiment 6 of the present invention, at least one of both side parts defining each cutout 20F in a direction perpendicular to the axial direction Z is sloped with respect to the axial direction Z. The width of the cutout 20F near the end in the axial direction Z of the sheet-like insulator 20 is set to be wider than that near the bottom of the cutout 20F.

As described above, at least one of both side parts defining each cutout 20F is sloped and the width of the cutout 20F near the end is set to be wider than that near the bottom thereof. Therefore, in insertion of the sheet-like insulator 20 into the gap 13C between the thin portion 13A and the projection 13B, the sheet-like insulator 20 is moved in a direction perpendicular to the axial direction Z and inserted such that the above sloped part is on the rear side, whereby the projection 13B can be easily passed through each cutout 20F. Thus, arrangement of the sheet-like insulator 20 to the core 40 and the winding frames 10 is facilitated and the magnetic pole can be efficiently manufactured.

Embodiment 7

Figure 26:
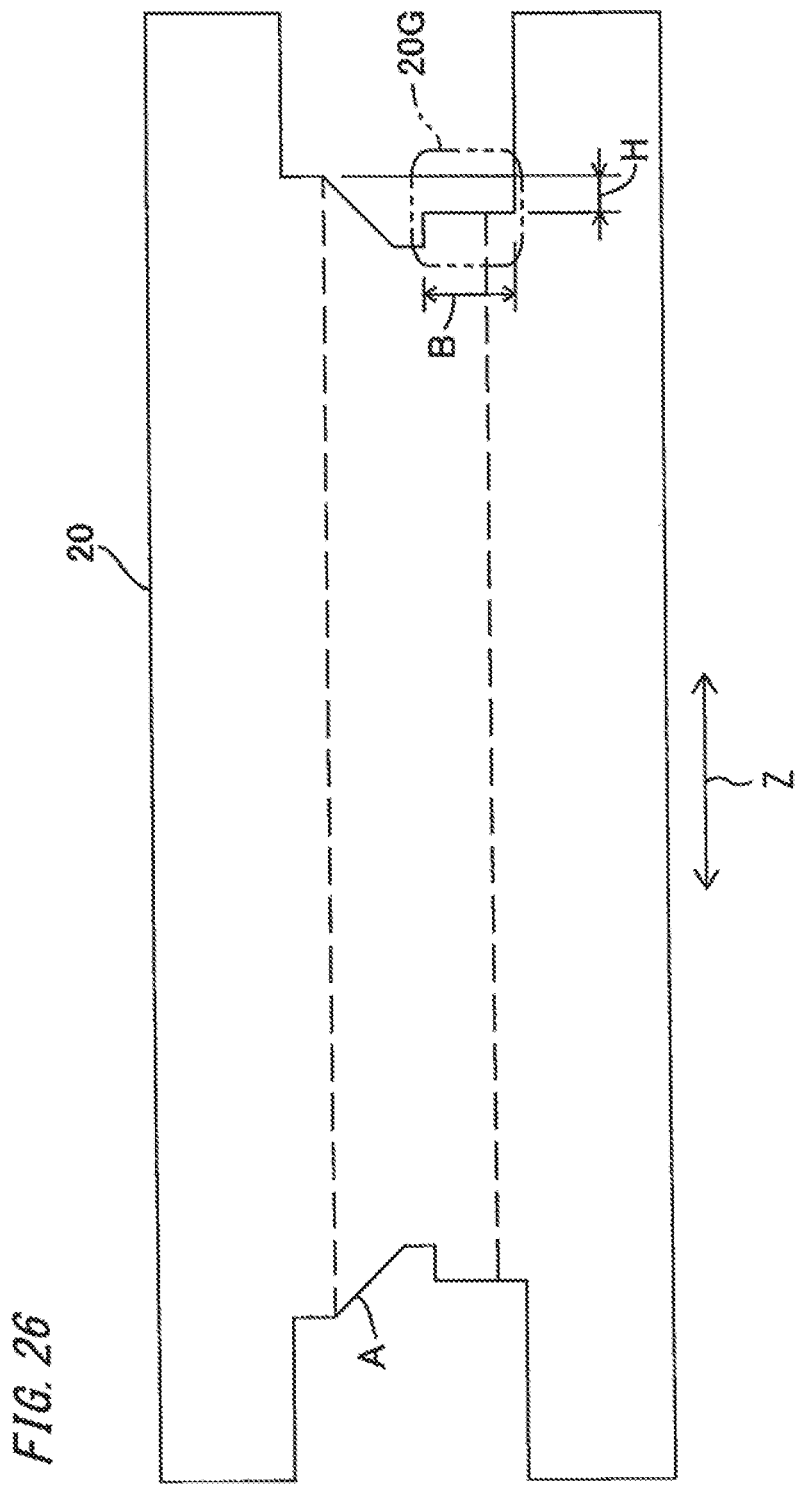
FIG. 26 is a plan view of a sheet-like insulator in embodiment 7.

FIG. 26 is a plan view of a sheet-like insulator 20 in embodiment 7 of the present invention. Embodiment 7 is similar to embodiment 4 and embodiment 6, and the sheet-like insulator 20 has cuts 20G having an increased width B without changing the depth H. In embodiment 7, each cut 20G is expanded up to the part defining the cutout 20F, thus forming a step from the bottom of the cutout 20F. Also in the case of such a shape, the same effect as in embodiment 4 and embodiment 6 is obtained.

Embodiment 8

Figure 27:
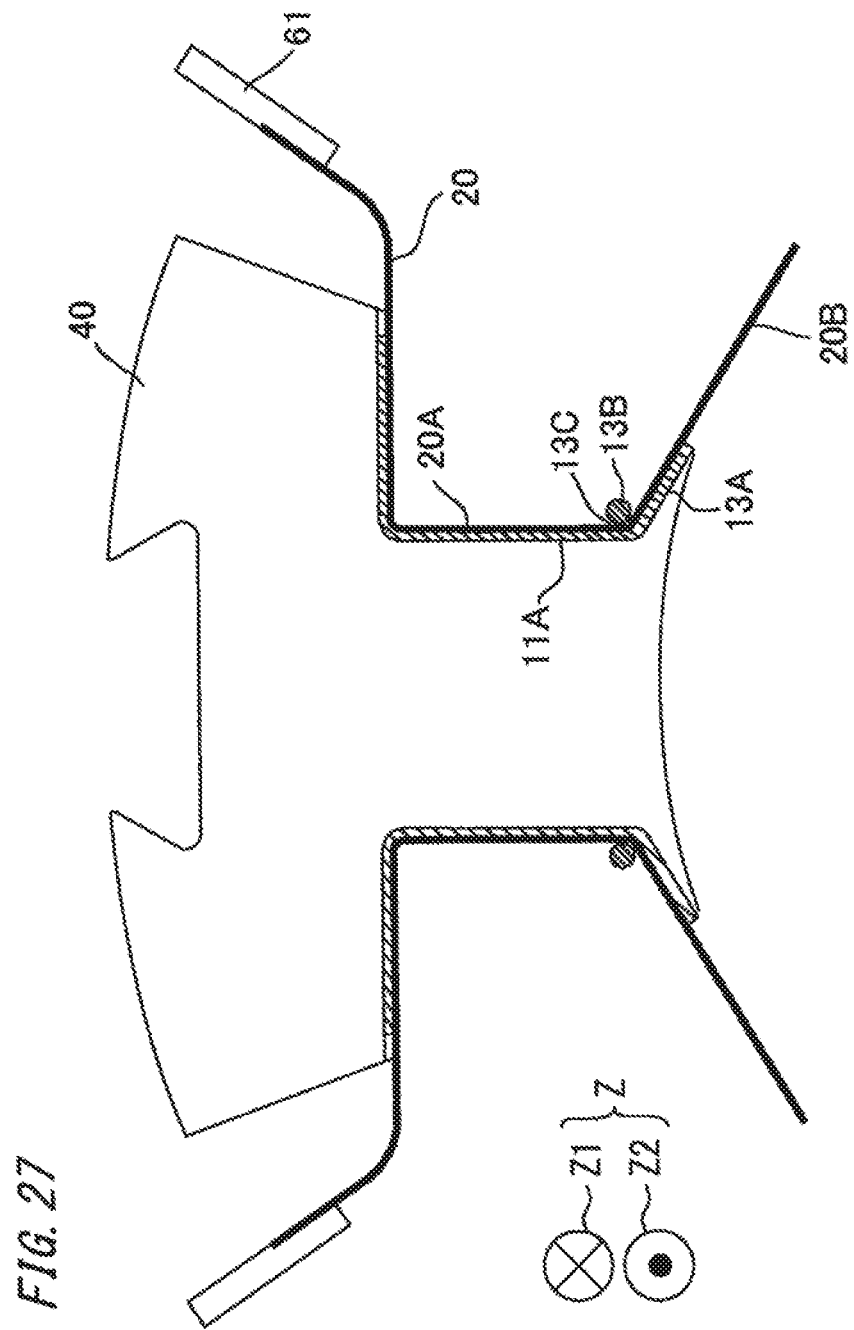
FIG. 27 is a sectional view of a magnetic pole in embodiment 8.

FIG. 27 is a sectional view of a magnetic pole 50 in embodiment 8 of the present invention. In embodiment 8, each projection 13B has a columnar shape, and is formed on the trunk portion 11, at a position near the thin portion 11A of the trunk portion 11. Each sheet-like insulator 20 is held by being located in the gap 13C between the projection 13B and the thin portion 11A of the trunk portion 11. Even by employing such a structure, the sheet-like insulators 20 can be held, and insulation of the entire magnetic pole 50 by the sheet-like insulators 20 and productivity of the magnetic pole 50 are improved. Here, each projection 13B has a columnar shape, but is not limited thereto. Each projection 13B may be provided at such a position as to stride over both the thin portion 11A of the trunk portion 11 and the thin portion 13A of the second flange 13, and also in this case, the same effect is obtained.

A stator obtained by arranging a plurality of the magnetic poles 50 according to embodiments 1 to 8 of the present invention in an annular shape, welding and fixing the cores 40, and performing necessary wire connection for the coils 30 has increased insulation property and increased productivity as compared to the conventional stator.

Embodiment 9

Figure 28:
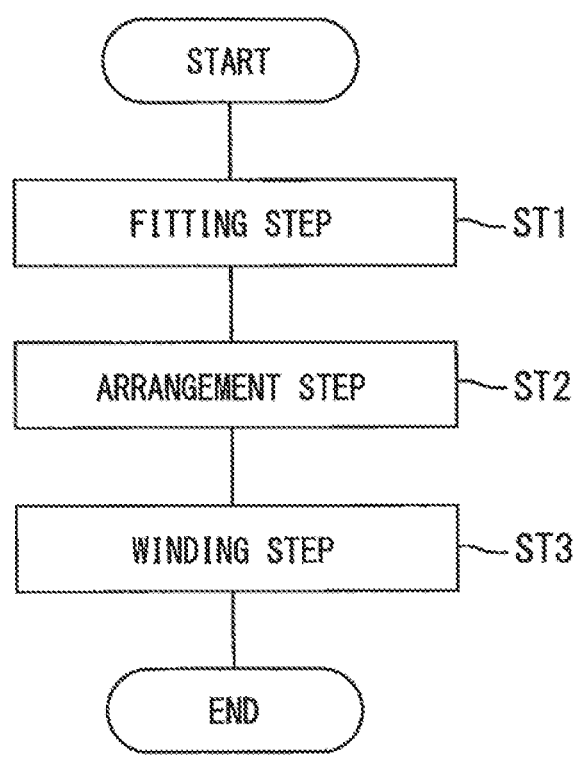
FIG. 28 is a flowchart showing a method for manufacturing a magnetic pole according to embodiment 9.

FIG. 28 is a flowchart showing a method for manufacturing a magnetic pole according to embodiment 9 of the present invention. In embodiment 9, the magnetic pole described in any one of embodiments 1 to 8 is manufactured.

As shown in FIG. 28, the method for manufacturing the magnetic pole includes a fitting step, an arrangement step, and a winding step. When this process is started, in the fitting step of step ST1, the winding frames 10 are fitted to both ends N1, N2 in the axial direction Z of the core 40. Next, in the arrangement step of step ST2, a part of the end of each sheet-like insulator 20 is arranged in the gap 13C between the thin portion 13A and the projection 13B. Next, in the winding step of step ST3, the coil 30 is wound around the tooth portion 41 with the winding frames 10 and the sheet-like insulators 20 provided therebetween. Then, the process is finished.

Owing to such a configuration, it is possible to fix the sheet-like insulators 20 to the core 40 and the winding frames 10 in a state in which the winding frames 10 and the sheet-like insulators 20 are arranged on the core 40 and the coil 30 has not been wound yet. Therefore, it is possible to omit a process of adhering or joining the sheet-like insulators 20 to the winding frames 10, and thus the magnetic pole can be manufactured easily and efficiently.

The rotary electric machine including the stator according to the present invention is applicable as a rotary electric machine provided to an air-conditioner compressor, or a rotary electric machine such as an industrial servomotor or an in-vehicle motor.

It is noted that, within the scope of the present invention, the above embodiments may be freely combined with each other, or each of the above embodiments may be modified or simplified as appropriate.

In the present invention, the following embodiments are also possible.

In the magnetic pole 50 formed by the winding frames 10, the sheet-like insulators 20, and the coil 30 attached to the core 40, the core 40 is composed of the yoke portion 42, the tooth portion 41, and the end portion 43 extending in an arc shape from the tooth portion 41; each winding frame 10 is composed of the first flange 12 provided to the yoke portion 42 and having the thin portion 12A, the second flange 13 opposed to the first flange 12 and having the thin portion 13A and the projection 13B extending in the axial direction Z from around the end portion 43, and the trunk portion 11 connecting the first flange 12 and the second flange 13 and having the thin portion 11A formed so as to stride over the tooth portion 41; the winding frames 10 are provided at both ends N1, N2 in the axial direction Z of the core 40; each insulator 20 is composed of the first surface 20A to be mounted to the side surface of the tooth portion 41 and the thin portion 11A of the trunk portion 11, the second surface 20B which is connected to the first surface 20A and is inserted into the slit 13C provided between the projection 13B and the thin portion 13A near the end portion 43, thereby fixing the position of the insulator 20 with respect to the core 40, the third surface 20C which is connected to the first surface 20A and is mounted to the inner surface of the yoke portion 42 and the thin portion 12A of the first flange 12, the extension surface 20D connected to the third surface 20C, and the fourth surface 20E connected to the extension surface 20D; the axial-direction lengths of the first surface 20A, the second surface 20B, and the third surface 20C are the same as the axial-direction length of the core 40; the axial-direction length of the extension surface 20D is a length obtained by adding a predetermined length to the axial-direction length of the third surface 20C; the extension width of the extension surface 20D has a length equal to or greater than the predetermined length; the axial-direction length of the fourth surface 20E is the same as the axial-direction length of the extension surface 20D; the coil 30 is wound in an area surrounded by the first surface 20A, the second surface 20B, and the third surface 20C, and on the trunk portion 11; and the fourth surface 20E of the insulator 20, or the second surface 20B and the fourth surface 20E of the insulator 20, overlap the surface of the coil 30.

In the above magnetic pole, each insulator 20 is inserted into the slit 13C formed by the thin portion 11A of the winding frame 10 and the dummy coil 30A, 30B provided on the first flange 12 side of the winding frame 10, whereby the insulator 20 is fixed along the side surface of the tooth portion 41 of the core 40.

In the above magnetic pole, the axial-direction lengths of the thin portion 12A of the first flange 12, the thin portion 11A of the trunk portion 11, and the thin portion 13A near the end portion 43 are equal to or greater than the insulation distance prescribed by laws or standards, and the predetermined length of the insulator 20 is also equal to or greater than the insulation distance.

In the above magnetic pole, the length of the thin portion 12A on the first flange 12 side is greater than the length of the thin portion 13A on the second flange 13 side, and the end of the thin portion 11A of the trunk portion 11 has a taper shape or partially has a taper shape.

In the above magnetic pole, the axial-direction length of the projection 13B is smaller than the axial-direction length of the thin portion 11A of the winding frame 10.

In the above magnetic pole, the chamfer 13D is formed at the end in the axial direction Z of the projection 13B.

In the above magnetic pole, the first surface 20A of each insulator 20 has, on both ends in the axial direction Z, the cutouts 20F which allow the projections 13B to pass therethrough.

In the above magnetic pole, each insulator 20 has cuts 20G having a width corresponding to two wires of the conductor of the coil 30, at both ends in the axial direction Z at the boundary between the first surface 20A and the third surface 20C.

A stator is formed by arranging a plurality of the magnetic poles 50 in an annular shape.

A method for manufacturing the magnetic pole includes the following steps.

In step 1, a pair of winding frames 10 are attached to the core 40.

In step 2, the second surface 20B of each insulator 20 is inserted into the slit 13C of the winding frame 10.

In step 3, the boundary part between the first surface 20A and the third surface 20C of each insulator 20 is brought into close contact with the core 40, using the insulator holder 60 which is a dedicated tool.

In step 4, the fourth surface 20E of each insulator 20 is deformed to bend toward the yoke portion 42 side of the core 40, using the end holder 61 which is a dedicated tool.

In step 5, the insulator holders 60 are removed.

In step 6, a conductor is wound by a winding machine, to form the coil 30.

In step 7, each insulator 20 is folded so that the fourth surface 20E thereof covers the surface of the coil 30 or the second surface 20B and the fourth surface 20E thereof cover the surface of the coil 30.

Another method for manufacturing the magnetic pole includes the following steps.

In step 1, one winding frame 10 is mounted to one end in the axial direction Z of the core 40.

In step 2, each insulator 20 is slid in the axial direction Z while being in contact with the core 40, and thus the second surface 20B of the insulator 20 is inserted into the slit 13C of the winding frame 10.

In step 3, the other winding frame 10 to be mounted to the other end of the core 40 is attached so that the second surface 20B of the insulator 20 is inserted into the slit 13C of the other winding frame 10.

In step 4, the boundary part between the first surface 20A and the third surface 20C of each insulator 20 is brought into close contact with the core 40, using the insulator holder 60 which is a dedicated tool.

In step 5, the fourth surface 20E of each insulator 20 is deformed to bend toward the yoke portion 42 side of the core 40, using the end holder 61 which is a dedicated tool.

In step 6, the insulator holders 60 are removed.

In step 7, a conductor is wound by a winding machine, to form the coil 30.

In step 8, each insulator 20 is folded so that the fourth surface 20E thereof covers the surface of the coil 30 or the second surface 20B and the fourth surface 20E thereof cover the surface of the coil 30.

The invention claimed is:

1. A magnetic pole to form at least a part of a stator of a rotary electric machine by a plurality of the magnetic poles being arranged in an annular shape, the magnetic pole comprising:
   a core having an arc-shaped yoke portion forming a part of an outer circumferential portion of the stator, a tooth portion projecting from the yoke portion toward a central axis of the stator, and an end portion extending in a circumferential direction of the stator from an end on a central axis side of the tooth portion;
   winding frames provided to both ends, in a direction along the central axis, of the core, the winding frames having thin portions extending in the direction along the central axis from the end positions, and projections projecting in the axis direction and having axial-direction lengths shorter than those of the thin portions; and
   sheet-like insulators provided on both sides in the circumferential direction of the tooth portion, wherein
   a part, of each insulator, that is located on a side surface of the tooth portion, has an axial-direction length equal to or smaller than an axial-direction length of the core, and is held by being sandwiched between the projection and the thin portion provided to each winding frame.

2. The magnetic pole according to claim 1, wherein
   each winding frame has: a first flange located on a yoke portion side; a second flange located on the end portion side; and a trunk portion provided between the first flange and the second flange,
   the projection is provided to the second flange, and
   a part of each insulator is held by being sandwiched between the projection and a part of the thin portion provided to the second flange.

3. The magnetic pole according to claim 2, wherein
   the tooth portion covered with the thin portions is recessed by an amount corresponding to a thickness of the thin portions.

4. The magnetic pole according to claim 2, wherein
   each winding frame has, on a yoke portion side, a guiding projection for guiding a coil to be wound.

5. The magnetic pole according to claim 2, wherein
   at least a part of a center side end in the central axis direction of the thin portion provided at a circumferential-direction end portion of each winding frame is sloped toward respective both ends in the direction along the central axis of the core, from a yoke portion side toward an end portion side.

6. The magnetic pole according to claim 2, wherein
   a length of each projection in the direction along the central axis is shorter than a minimum length in the direction along the central axis of the thin portion that each winding frame has.

7. The magnetic pole according to claim 2, wherein
   each projection has a chamfer for guiding the insulator, at an end thereof in the direction along the central axis.

8. The magnetic pole according to claim 2, wherein
   each insulator has a cutout at a position that is at an end thereof in the direction along the central axis and on a radially outer side with respect to each projection, the cutout having an axial-direction length equal to or greater than a length of each projection and shorter than an axial-direction length of each thin portion, and having a radial-direction width through which the projection is able to pass.

9. The magnetic pole according to claim 1, wherein
   each winding frame has: a first flange located on a yoke portion side; a second flange located on the end portion side; and a trunk portion provided between the first flange and the second flange
   the projection is provided to the second flange, and
   a part of each insulator is held by being sandwiched between the projection and a part of the thin portion provided to the trunk portion.

10. The magnetic pole according to claim 1, wherein
    the tooth portion covered with the thin portions is recessed by an amount corresponding to a thickness of the thin portions.

11. The magnetic pole according to claim 1, wherein
    each winding frame has, on a yoke portion side, a guiding projection for guiding a coil to be wound.

12. The magnetic pole according to claim 1, wherein
    at least a part of a center side end in the central axis direction of the thin portion provided at a circumferential-direction end portion of each winding frame is sloped toward respective both ends in the direction along the central axis of the core, from a yoke portion side toward an end portion side.

13. The magnetic pole according to claim 1, wherein
    a length of each projection in the direction along the central axis is shorter than a minimum length in the direction along the central axis of the thin portion that each winding frame has.

14. The magnetic pole according to claim 1, wherein
    each projection has a chamfer for guiding the insulator, at an end thereof in the direction along the central axis.

15. The magnetic pole according to claim 1, wherein
    each insulator has a cutout at a position that is at an end thereof in the direction along the central axis and on a radially outer side with respect to each projection, the cutout having an axial-direction length equal to or greater than a length of each projection and shorter than an axial-direction length of each thin portion, and having a radial-direction width through which the projection is able to pass.

16. The magnetic pole according to claim 15, wherein
    of both side parts defining the cutout in a direction perpendicular to the central axis, an end positioned on a radially inner side is sloped with respect to the direction along the central axis, and
    a width of the cutout in the direction perpendicular to the central axis, near a central-axis-direction end of the sheet-like insulator, is greater than that near a bottom of the cutout.

17. A method for manufacturing the magnetic pole according to claim 15, the method comprising:

a fitting step of fitting a pair of the winding frames to both ends in the central axis direction of the core;

an arrangement step of arranging a part of an end in the central axis direction of each sheet-like insulator, into a gap between each thin portion and each projection, while sliding the insulator in a radial direction, after the cutout of the insulator passes the projection; and a winding step of winding a coil around the tooth portion with the winding frames and the sheet-like insulators provided therebetween.

18. A stator comprising the magnetic poles according to claim 1, and forming a part of the rotary electric machine.

19. A magnetic pole to form at least a part of a stator of a rotary electric machine by a plurality of the magnetic poles being arranged in an annular shape, the magnetic pole comprising:

a core having an arc-shaped yoke portion forming a part of an outer circumferential portion of the stator, a tooth portion projecting from the yoke portion toward a central axis of the stator, and an end portion extending in a circumferential direction of the stator from an end on a central axis side of the tooth portion;

winding frames provided to both ends, in a direction along the central axis, of the core, the winding frames having thin portions extending in the direction along the central axis, and projections projecting in the direction; and sheet-like insulators provided on both sides in the circumferential direction of the tooth portion, wherein a part of each insulator is held by being sandwiched between the projection and the thin portion provided to each winding frame, and at least a part of a center side end in the central axis direction of the thin portion provided at a circumferential-direction end portion of each winding frame is sloped toward respective both ends in the direction along the central axis of the core, from a yoke portion side toward an end portion side.

20. A magnetic pole to form at least a part of a stator of a rotary electric machine by a plurality of the magnetic poles being arranged in an annular shape, the magnetic pole comprising:

a core having an arc-shaped yoke portion forming a part of an outer circumferential portion of the stator, a tooth portion projecting from the yoke portion toward a central axis of the stator, and an end portion extending in a circumferential direction of the stator from an end on a central axis side of the tooth portion;

winding frames provided to both ends, in a direction along the central axis, of the core, the winding frames having thin portions extending in the direction along the central axis, and projections projecting in the direction; and sheet-like insulators provided on both sides in the circumferential direction of the tooth portion, wherein a part of each insulator is held by being sandwiched between the projection and the thin portion provided to each winding frame, each insulator has a cutout allowing each projection to pass therethrough, at a predetermined position at an end thereof in the direction along the central axis, of both side parts defining the cutout in a direction perpendicular to the central axis, an end positioned on a radially inner side is sloped with respect to the direction along the central axis, and a width of the cutout in the direction perpendicular to the central axis, near a central-axis-direction end of the sheet-like insulator, is greater than that near a bottom of the cutout.

* * * * *